(12) United States Patent
Udagawa et al.

(10) Patent No.: US 7,144,449 B2
(45) Date of Patent: Dec. 5, 2006

(54) PRINT INK CONTAINING A PLURALITY OF FLUORESCENT COLORING MATERIALS AND INKJET RECORDING METHOD

(75) Inventors: Masako Udagawa, Kanagawa (JP); Sadayuki Sugama, Ibaraki (JP); Shoji Koike, Kanagawa (JP); Makoto Aoki, Kanagawa (JP); Akira Nagashima, Tokyo (JP); Shinichi Hakamada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 9 days.

(21) Appl. No.: 10/866,116

(22) Filed: Jun. 14, 2004

(65) Prior Publication Data
US 2004/0231554 A1    Nov. 25, 2004

Related U.S. Application Data

(63) Continuation of application No. PCT/JP03/08103, filed on Jun. 26, 2003.

(30) Foreign Application Priority Data
May 2, 2003    (JP) .............................. 2003-127618

(51) Int. Cl.
C09D 11/02    (2006.01)
C09K 11/02    (2006.01)

(52) U.S. Cl. ............................. 106/31.15; 106/31.32; 106/31.64; 252/301.36; 252/301.35; 252/301.16

(58) Field of Classification Search ............. 106/31.15, 106/31.32, 31.64; 252/301.36, 301.35, 301.16
See application file for complete search history.

(56) References Cited

U.S. PATENT DOCUMENTS

| | | | |
|---|---|---|---|
| 4,153,593 A * | 5/1979 | Zabiak et al. ............... | 524/110 |
| 5,515,093 A | 5/1996 | Haruta et al. ............... | 347/101 |
| 5,865,883 A | 2/1999 | Teraoka et al. ........... | 106/31.32 |
| 5,922,625 A | 7/1999 | Haruta et al. .................. | 442/75 |
| 6,176,908 B1 | 1/2001 | Bauer et al. ............. | 106/31.15 |
| 6,676,254 B1 | 1/2004 | Nagashima et al. ........ | 347/100 |
| 6,676,734 B1 | 1/2004 | Nagashima et al. ..... | 106/31.32 |
| 6,698,876 B1 | 3/2004 | Sato et al. .................. | 347/100 |
| 6,827,769 B1 * | 12/2004 | Auslander et al. ....... | 106/31.32 |
| 2002/0047884 A1 | 4/2002 | Nagashima et al. ........ | 347/100 |
| 2002/0063765 A1 | 5/2002 | Hakamada et al. ......... | 347/100 |
| 2004/0074419 A1 | 4/2004 | Nagashima et al. ..... | 106/31.32 |

FOREIGN PATENT DOCUMENTS

| JP | 60-45669 B2 | 10/1985 |
|---|---|---|
| JP | 11-80632 A | 3/1999 |

(Continued)

*Primary Examiner*—J. A. Lorengo
*Assistant Examiner*—Veronica Faison-Gee
(74) *Attorney, Agent, or Firm*—Fitzpatrick, Cella, Harper & Scinto

(57) ABSTRACT

The present invention provides a fluorescence ink having a high fluorescence intensity, and an ink jet recording method using the same. The ink contains a first fluorescent coloring material that emits fluorescence at a predetermined fluorescence wavelength to be used for measurement or determination with excitation at a predetermined excitation wavelength, a second fluorescent coloring material that emits fluorescence on excitation at the predetermined excitation wavelength, where the excitation spectrum of the first coloring material in the ink to obtain the fluorescence at the predetermined emission wavelength has a peak wavelength range next to the predetermined fluorescence wavelength, and the emission fluorescence spectrum of the second coloring material has an emission wavelength region substantially including at least the above peak wavelength range.

2 Claims, 14 Drawing Sheets

FOREIGN PATENT DOCUMENTS

| | | |
|---|---|---|
| JP | 11-209675 A | 8/1999 |
| JP | 2003-113331 A | 4/2003 |
| JP | 2003-113332 A | 4/2003 |
| JP | 2003-192962 A | 7/2003 |
| WO | WO 02/092707 A1 | 11/2002 |

* cited by examiner

US 7,144,449 B2

PRINT INK CONTAINING A PLURALITY OF FLUORESCENT COLORING MATERIALS AND INKJET RECORDING METHOD

This application is a continuation of International Application No. PCT/JP03/08103, filed Jun. 26, 2003, which claims the benefit of Japanese Patent Application No. 2003-127618 filed on May 2, 2003.

BACKGROUND OF THE INVENTION

1. Field of the Invention

The present invention relates to a print ink containing a plurality of fluorescent coloring materials applicable to printers-including inkjet apparatuses, offset printers, plotters, and line printers etc., a print ink capable of increasing fluorescence properties of a printed image using such a print ink, and an inkjet recording method using such a print ink. Specifically, the present invention provides a novel technique to improve fluorescence emission characteristics of a second fluorescent coloring material to be contained in a print ink containing a first fluorescent coloring material, where the first coloring material emits fluorescence with light of a predetermined excitation wavelength and the wavelengths of the emitted fluorescence include a predetermined fluorescence wavelength for measurement or determination.

2. Related Background Art

In recent years, various applications have been requested for ink. As such applications, in addition to formation of beautiful color images, there are proposed, for example, use of fluorescence ink for providing information (such as security information) in addition to visual information, by printing information such as characters, numbers, symbols, or bar-codes with such an ink on a recording medium and irradiating UV light of an appropriate wavelength to generate colored fluorescence from the fluorescence ink. Specifically, in a system for reading out authentication (anti-counterfeit) information or security information using an apparatus to excite fluorescence and read the emission intensity thereof, a fluorescent coloring agent is excited by excitation light of a predetermined wavelength (e.g., 254 nm) to fluoresce, and the fluorescence is determined or measured.

Regarding the coloring materials in the ink, dyes can provide a predetermined color easily but occasionally poor water-resistance, while pigments can give excellent water resistance but not the predetermined color tone occasionally. In view of the above, there is proposed ink containing both dye and pigment to obtain an ink capable of providing an image excellent in both water-resistance and color tone. For example, Japanese Patent Publication No. S60-45669 discloses a recording liquid that contains a water-soluble red dye (e.g., Acid Red 52) and a red pigment as recording agents, and a polymer dispersant for dispersing the pigment in a liquid medium.

In the mailing systems of the United States, printing with fluorescent red is common, and a dye such as Acid Red 52 (AR52), which is described in the above publication, is used as a fluorescent dye. U.S. Pat. No. 6,176,908 discloses an ink containing a fluorescent dye, a pigment and a polymer as a dispersant for the pigment, exemplifying AR52 as a fluorescent dye. It should be noted, it had been a well-known design matter long before U.S. Pat. No. 6,176,908 to adjust the final color shade according to human visual sensation by combination of dyes.

U.S. Pat. No. 6,176,908 provides an inkjet ink containing a pigment in addition to a fluorescent dye for improving the water-resistance of the ink as with Japanese Patent Publication No. S60-45669, and there are described addition of two kinds of fluorescent dyes for the known object of visible (visual) color adjustment, and also additives for improving fluorescence intensity (PMU level) to the system. Concrete ink examples of improved fluorescence intensity (PMU level) contain solvents such as water, 2-pyrrolidone, and tetraethylene glycol, and the following fluorescent coloring materials other than the pigment-related component comprised of a pigment, a polymer and tetraethylene glycol or diethylene glycol. As the fluorescent coloring materials, a combination of AR52 (0.4% by mass, 0.5% by mass to 3.0% by mass) and one of AY7, AY73, and DY96, and a combination of basic violet (RHDB) and basic yellow (BY40) are described, for example.

Japanese Patent Application Laid-Open No. H11-80632 discloses an invisible fluorescence aqueous ink containing three different fluorescent coloring materials (a fluorescence brightening agent, a yellow fluorescent dye of a coumarin derivative, and a red fluorescent dye of rhodamine-B or rhodamine-6G), and postcard printing using the ink. In the technical descriptions thereof, each of these three fluorescent coloring materials emits light under UV light irradiation to excite the other coloring material sequentially leading to final fluorescence emission having a wavelength peak at 587 nm. In this publication, however, there is no concrete description about excitation wavelengths, and the technical description is made using a result that the ink and the recorded image show the same fluorescence characteristics. Generally, water absorbs UV light, so that the fluorescence of a recorded image will be different from that of the ink used. Judging from this, the invention described in the publication lacks technical credibility.

WO 02/092707 discloses an ink that can form a dark image and also exhibit fluorescence of a predetermined color when exposed exciting radiation. The ink contains a plurality of dyes (e.g., red and yellow fluorescent dyes, a blue dye, and a black dye) as with Japanese Patent Application Laid-Open No. H11-80632, but differs from Japanese Patent Application Laid-Open No. H11-80632 in that dyes are selected such that the longer wavelength absorption band and the shorter wavelength emission band would not overlap. In this publication, the relationship between the fluorescent coloring materials is not analyzed sufficiently so that the desired fluorescence intensity cannot always be obtained.

Japanese Patent Application Laid-Open No. 2003-113331 discloses an invention for improving the fluorescence characteristics of ink in terms of the relationship between solvents and fluorescent coloring materials. In other words, Japanese Patent Laid-Open No. 2003-113331 discloses a recording ink that includes two fluorescent coloring materials of the same color (there is an example where a non-fluorescent coloring material is added), two different organic solvents (e.g., glycerin and a nonionic surfactant) which have no compatibility to each other, and pure water for dissolving these components.

SUMMARY OF THE INVENTION

The conventional inks containing a combination of a plurality of fluorescent dyes are only to combine part of their characteristics in order to improve the fluorescence intensity at a predetermined fluorescence wavelength (e.g., a band ranging from 580 nm to 620 nm, or one fluorescence wavelength within this range). In other words, the above publications do not provide any technology that can improve the fluorescence intensity of a first fluorescent coloring material at a predetermined wavelength region (e.g., 580 nm to 620 nm) upon exposure to a predetermined excitation light in a relationship with other fluorescent coloring materials (hereinafter, referred to as a second coloring material). Therefore, the technological problems to be solved by the present invention include analysis of the relationship between a plurality of fluorescent dyes, the characteristics of ink, the composition of ink, and the image formed. Therefore, a main object of the present invention is to provide a novel method for obtaining fluorescence intensity most efficiently with a plurality of fluorescent dyes, on the basis of the substantial analysis of the phenomenon of "fluorescence". Accordingly, the inventors of the present invention have done a fundamental technical investigation in consideration of the phenomenon of "fluorescence" and a mechanism thereof. For example, the inventors of the present invention have investigated the phenomenon that although the fluorescent dye AR52 mentioned above emits sufficient red fluorescence even in an ink containing water that absorbs UV light, the recorded image with the dye shows weak fluorescence under UV excitation light. Such an investigation on the phenomenon revealed that the excitation wavelength for AR52 to emit red fluorescence distributes not only in the UV region but also in the visible-light region, and the fluorescent intensity is influenced by the fixing state of the dye in the recording medium. Therefore, the main object of the present invention is to conduct technical analyses of how to provide excitation light as much as possible and how to make the fixing state of the dye in the recorded image suitable for fluorescence emission.

Furthermore, when AR52 is used as a first coloring material, a sufficient fluorescent intensity is obtained when water is evaporated from an ink containing AR52 0.01% by mass or less. However, there are additional matters for consideration including: loss of the coloring material into the recording medium such as a paper sheet or envelope, not fixed onto the surface fibers; and the concentration-quenching problem that the fluorescence intensity of the coloring material decreases with increase of the first and second coloring materials in the ink. Also it must be considered that the energy source is limited to the predetermined excitation light. Other analyses will be understood by the following description.

Therefore, the present invention solves at least one of the following problems (preferably, a plurality of the problems) for improving the fluorescence intensity in comparison with the conventional technical standard.

A first object of the present invention is to provide a print ink capable of increasing the fluorescence intensity thereof at a standard excitation wavelength such that the energy efficiency thereof is improved by focusing attention on a correlation between the fluorescence emission of a second coloring material to be generated by imparting light having the predetermined excitation wavelength and an excitation wavelength of a first coloring material for obtaining a predetermined emission wavelength (hereinafter, referred to as a predetermined fluorescence wavelength of a single wavelength or a wavelength interval).

A second object of the present invention is to provide a print ink capable of increasing the fluorescence intensity thereof at a predetermined emission wavelength such that the energy efficiency thereof is enhanced significantly by focusing attention on an absorption spectrum of a first coloring material and the fluorescence emission of a second coloring material to be generated by imparting light having the predetermined excitation wavelength.

A third object of the present invention is to provide a print ink capable of increasing the fluorescence intensity thereof at a predetermined emission wavelength by focusing attention on the knowledge obtained by analyzing a structural difference between fluorescent dyes (i.e., the amounts of the respective fluorescent dyes to be added can be increased by reasonably preventing the fluorescent dyes from being assembled).

A fourth object of the present invention is to provide a print ink capable of increasing the fluorescence intensity thereof at a predetermined emission wavelength by focusing attention on the involvement with the fluorescence emission of the second coloring material to be generated by imparting light having the predetermined excitation wavelength and the excitation wavelength characteristics for obtaining the predetermined emission fluorescence wavelength of the first coloring material, in addition to the third object.

A fifth object of the present invention is to provide a print ink capable of increasing the fluorescence intensity thereof at a predetermined emission wavelength more stably as the characteristics of the ink itself that contains a plurality of fluorescent coloring materials.

A sixth object of the present invention is to provide a print ink capable of increasing the fluorescence intensity thereof at a predetermined emission wavelength without substantially depending on the kind or characteristics of a recording medium on which an image is to be formed, that is owing to the knowledge obtained by analyzing an image to be formed.

A seventh object of the present invention is to provide a print ink capable of increasing the fluorescence intensity thereof at a predetermined emission wavelength by focusing attention on a correlation between the excitation characteristics of the first coloring material and the absorption spectrum of the second coloring material, in addition to the first object. Other problems and objects of the present invention will become apparent from the following description. Therefore, the present invention aims to attain at least one of the above objects (preferably, the plurality of objects) and to provide a print ink having excellent fluorescence intensity. In addition, the present invention also aims to provide an inkjet recording method using the print ink.

The present invention for attaining the above objects provides the following embodiments. The relationship between wavelengths in the invention is summarized as follows: the fluorescence emission wavelength range (see FIG. 3 described later) of a second fluorescent coloring material covers at least the peak wavelength range (see FIG. 2 described later) of the excitation wavelength spectrum of a first fluorescent coloring material for obtaining fluorescence at a predetermined emission wavelength (e.g., 600 nm), and optionally the absorption wavelength range in visible light region of the first fluorescent coloring material (see the lower graph of FIG. 6 as described later).

First of all, according to a first embodiment of the present invention for attaining at least the first object, there is provided a print ink that comprises:

a first fluorescent coloring material that emits fluorescence at a predetermined emission wavelength to be used for measurement or determination on excitation at a predetermined excitation wavelength; and a second fluorescent coloring material that emits a fluorescence on excitation at the predetermined excitation wavelength, wherein an excitation spectrum of the first coloring material in the ink to obtain the fluorescence at the predetermined emission wavelength has a peak wavelength range next to the predetermined fluorescence wavelength, and an emission fluorescence spectrum of the second coloring material has an emission wavelength region substantially including at least the peak wavelength range.

Here, the expression "a peak wavelength range that corresponds to a peak region next to the predetermined fluorescence wavelength" of the fluorescence emission from the first fluorescent coloring material of the present invention has a practical meaning in consideration of the energy conversion efficiency thereof. In other words, in the excitation wavelength spectrum for obtaining a predetermined fluorescence wavelength of the first fluorescent coloring material, a region having a peak next to the predetermined fluorescence wavelength of which intensity is 100 or more is defined as a peak region, and a range of wavelength corresponding to this region is defined as a peak wavelength range.

The predetermined excitation wavelength is preferably 254 nm, and the peak wavelength range is preferably 430 nm to 600 nm both inclusive. It is preferable that the emission wavelength range of the second fluorescent coloring material includes the predetermined fluorescence wavelength (600 nm), and ranges from 425 nm to 600 nm both inclusive. Furthermore, in the ink according to the first embodiment of the present invention, it is preferable that the absorption spectrum of the first fluorescent coloring material has a peak region in a visible light region, and the wavelength range of the fluorescence emission of the second fluorescent coloring material covers a region of shorter wavelength than the above peak region of the absorption spectrum.

According to a second embodiment of the present invention capable of attaining at least the second object, there is provided a print ink containing: a first fluorescent coloring material that emits fluorescence at a predetermined fluorescence wavelength to be used for measurement or determination on excitation with light of a predetermined excitation wavelength; and a second fluorescent coloring material that emits fluorescence by excitation at the predetermined excitation wavelength, where an emission wavelength region of the second fluorescent coloring material includes at least a main absorption wavelength region in a light absorption spectrum of the first fluorescent coloring material in an excitation wavelength region for obtaining the emission at the predetermined fluorescence wavelength of the first fluorescent coloring material in the ink.

In the ink according to the second embodiment of the present invention, it is preferable that the main absorption wavelength region of the first fluorescent coloring material is in the range of 500 nm to 590 nm both inclusive, and the main emission wavelength region of the second fluorescent coloring material is in the range of 450 nm to 600 nm both inclusive.

Furthermore, in the ink according to each of the first and second embodiments of the present invention, it is preferable that the second fluorescent coloring material is a coloring material having a structure with a plurality of fluorescence groups.

According to a third embodiment of the present invention capable of attaining at least the third object, there is provided a print ink containing: a first fluorescent coloring material that emits fluorescence at a predetermined fluorescence wavelength to be used for measurement or determination on excitation at a predetermined excitation wavelength; and a second fluorescent coloring material that emits fluorescence on excitation at the predetermined excitation wavelength and enhances an emission intensity at the predetermined fluorescence wavelength, where the second fluorescent coloring material has a plurality of fluorescence groups.

In the ink according to the third embodiment of the invention, it is preferable that an emission wavelength region of the second fluorescent coloring material is in the excitation wavelength region for obtaining the predetermined fluorescence wavelength of the first fluorescent coloring material in the ink.

According to a fourth embodiment of the present invention capable of attaining at least the fourth object, there is provided a print ink containing: a first fluorescent coloring material that emits fluorescence at a predetermined fluorescence wavelength to be used for measurement or determination on excitation at a predetermined excitation wavelength; and a second fluorescent coloring material that emits fluorescence on excitation at the predetermined excitation wavelength, where the second fluorescent coloring material has a plurality of fluorescence groups, and an emission wavelength region of the second fluorescent coloring material overlaps with at least a part of an excitation wavelength region for obtaining emission at the predetermined fluorescence wavelength of the first fluorescent coloring material in the ink.

In the ink according to each of the third and fourth embodiments of the present invention, it is preferable that each of the plurality of fluorescence groups in the second fluorescent coloring material has a basic structure for brightening its fluorescence. In addition, the second fluorescent coloring material preferably has a plurality of sulfone groups.

In the ink according to any one of the first to ,fourth embodiments of the present invention, the plurality of fluorescence groups in the second fluorescent coloring material are preferably in a dimer form. Meanwhile, in the first to fourth embodiments of the present invention, the second fluorescent coloring material is preferably a direct dye.

Furthermore, the print ink according to each of the third and fourth embodiments of the present invention is preferably an aqueous ink which emits fluorescence on excitation at the predetermined excitation wavelength where the aqueous print ink is in a water-evaporated state and/or a printed image state, of which emission spectrum has a first peak including the predetermined fluorescence wavelength and a second peak in a wavelength region corresponding to the excitation wavelength region of the first fluorescent coloring material for obtaining the emission at the predetermined fluorescence wavelength in the ink.

According to a fifth embodiment of the present invention for attaining at least the fifth object, there is provided an aqueous print ink containing: a first fluorescent coloring material that emits fluorescence at a predetermined fluorescence wavelength to be used for measurement or determination on excitation at a predetermined excitation wavelength; and a second fluorescent coloring material that emits fluorescence on excitation at the predetermined excitation wavelength, which emits fluorescence by the predetermined excitation wavelength while the aqueous print ink is in a water-evaporated state and/or a printed image state, of which emission spectrum has a first peak including the predetermined fluorescence wavelength and a second peak in a wavelength region corresponding to the excitation wavelength region of the first fluorescent coloring material for obtaining the emission at the predetermined fluorescence wavelength in the ink. In the ink according to the fifth embodiment of the present invention, preferably, the second fluorescent coloring material may have a structure having a plurality of fluorescence groups.

According to a sixth embodiment of the present invention for attaining at least the sixth object, there is provided a print ink containing: a first fluorescent dye that emits fluorescence at a predetermined fluorescence wavelength to be used for measurement or determination on excitation at a predetermined excitation wavelength; a second fluorescent dye for emitting fluorescence on excitation at the predetermined excitation wavelength and for enhancing an emission intensity at the predetermined fluorescence wavelength; and a solvent including a first solvent that shows relatively high solubility to the first fluorescent dye, and low solubility to the second fluorescent dye, and a second solvent that shows high solubility to the second fluorescent dye and compatibility to the first solvent.

In the ink according to the sixth embodiment of the invention, each of the first fluorescent dye and the second fluorescent dye may preferably have a sulfone group. In addition, it is preferabe that an emission wavelength region of the second fluorescent dye substantially covers a peak wavelength range next to the predetermined fluorescence wavelength in an excitation spectrum of the first fluorescent dye for obtaining fluorescence of the predetermined fluorescence wavelength in the ink. In the ink according to the 'sixth embodiment of the present invention, furthermore, the emission wavelength region of the second fluorescent dye may be preferably in the excitation wavelength region of the first fluorescent dye for obtaining fluorescence at the predetermined fluorescence wavelength excluding a region corresponding to a main absorption wavelength region in a light absorption spectrum of the first fluorescent dye.

On the other hand, the print ink according to the sixth embodiment of the present invention may be preferably an aqueous ink, where an emission spectrum of the ink, which emits fluorescence by the predetermined excitation wavelength when the aqueous print ink is in a water content evaporated ink state and/or a printed image state, exhibits a first peak that contains the emission at the, predetermined fluorescence wavelength and a second peak in the excitation wavelength region for obtaining the emission at the predetermined fluorescence wavelength of the first fluorescent coloring material in the ink.

According to a seventh embodiment of the present invention capable of attaining at least the seventh object, there is provided a print ink containing: a first fluorescent coloring material that emit fluorescence at a predetermined fluorescence wavelength to be used for measurement or determination on excitation at a predetermined excitation wavelength; and a second fluorescent coloring material that emits fluorescence on excitation at the predetermined excitation wavelength, where an emission wavelength range of the second fluorescent coloring material includes at least a peak wavelength range corresponding to a peak region next to the predetermined fluorescence wavelength in an excitation wavelength range of the first fluorescent coloring material for the predetermined fluorescence wavelength, and a main absorption wavelength range in a light absorption spectrum of the second fluorescent coloring material is in a shorter wavelength range than the excitation wavelength range of the first fluorescent coloring material. In the ink according to the seventh embodiment of the present invention, preferably, the predetermined excitation wavelength is 254 nm, the peak wavelength range of the first fluorescent coloring material is in the range of 430 nm to 600 nm both inclusive, and the absorption wavelength region of the second fluorescent coloring material is 440 nm or less.

In the ink according to any one of the first to five embodiments and the seventh embodiment of the present invention, more preferably, the print ink contains a first solvent showing a relatively high solubility to the first fluorescent dye and low solubility to the second fluorescent dye, a second solvent showing a high solubility to the second fluorescent dye and compatibility to the first solvent, and a third solvent showing no compatibility to the second solvent and solving the second fluorescent dye. This solvent condition can further improve the fluorescence intensities of the different fluorescent coloring materials of the present invention.

When one of the above print inks is used in inkjet recording, a recorded image excellent in fluorescence intensity is obtained. An inkjet recording method of the present invention to exert such an advantage is a method comprising the steps of ejecting ink through a discharge port and attaching the ink on a recording medium to thereby perform recording, in which the ink is one of the print inks according to one of the above embodiments.

DESCRIPTION OF THE PREFERRED EMBODIMENTS

Figure 1:
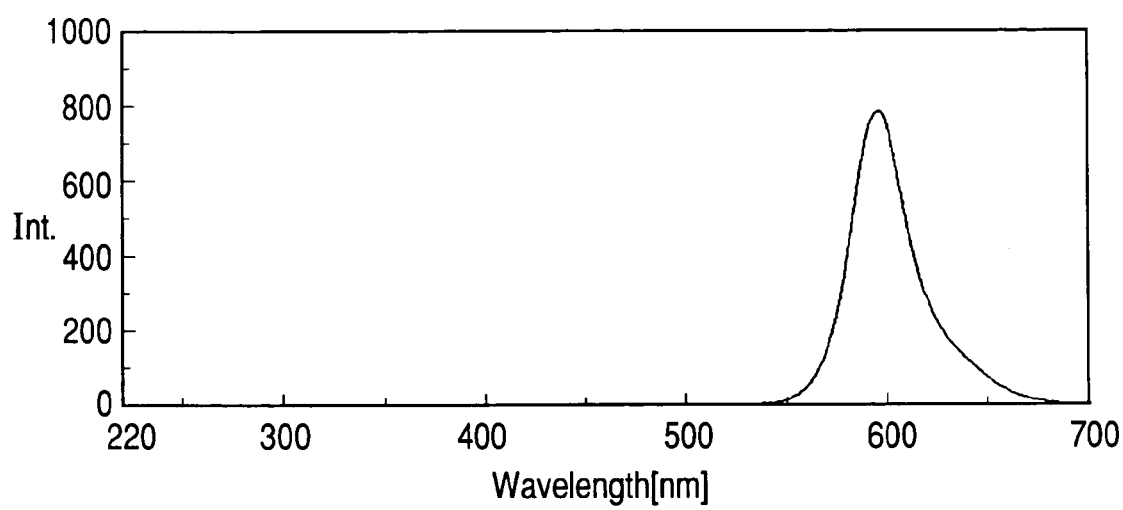
FIG. 1 shows a fluorescence emission spectrum of C.I. Acid Red 52 with excitation at 254 nm.

The present invention relates to a print ink, which contains a first fluorescent coloring material that fluoresces with a certain intensity at a predetermined fluorescence wavelength to be used for measurement or determination with excitation at a predetermined excitation wavelength, defining the relation of the first fluorescent coloring material with a second fluorescent coloring material that fluoresces with excitation at the predetermined excitation wavelength as described above.

In addition to those described in the objects, the inventors of the present invention have concentrated on the fluorescence intensity of an image formed with fluorescent coloring materials, studying the influence of various fluorescent coloring materials and the fluorescence intensities of print ink on the image formed therewith. The investigation on the factors affecting the fluorescence intensities of fluorescent coloring materials such as fluorescent dyes has revealed that the arrangement of coloring material molecules strongly affects the fluorescence intensities thereof. That is, in the case of AR52, a sufficient fluorescence intensity was observed in the visible region with an aqueous ink containing solely the dye at a concentration of 0.01% by mass or less, because the dye molecules were dispersed in a monomolecular state. On the other hand, with an aqueous solution containing 0.2% to 0.3% AR52 by mass, concentration quenching (decrease in fluorescence intensity with concentration increase) was observed. This means that sufficient fluorescence intensity was obtained when the coloring material molecules were present singly and at a high concentration so far as the molecular state is maintained, but if association, aggregation, or assembling of molecules occurs, or close encounter of molecules occurs due to high concentration, the radiation efficiency of the excitation light to each molecule decreases, or the fluorescence emission of each molecule is prevented by other molecules, decreasing fluorescence intensity as a whole.

Therefore, when the ink containing a fluorescent coloring material that may cause concentration quenching is used for recording on a recording medium, the fluorescent coloring material molecules cannot keep its single molecule state (monomolecular state) in the course of diffusion and penetration of the ink on the surface and inside of the recording medium. As a result, the molecular association, aggregation, assembling, etc. make rapid progress, resulting in decrease in fluorescence intensity. In this case, the fluorescent coloring material permeated and fixed inside the recording medium hardly contributes to fluorescence intensity. Furthermore, when the concentration of a fluorescent coloring material in ink is increased in order to increase the fluorescence intensity, the molecular association, aggregation, assembly, etc. of the coloring material tend to occur more in the recording medium, so that fluorescence intensity may not be increased in proportion to the increment of the coloring material.

Considering such behavior of the fluorescent coloring material, the inventors of the present invention focused attention on how to attain the single molecular state or similar state to obtain sufficient fluorescence intensity on a recording medium. Through extensive study, the inventors found that this object can be attained by a certain combination of a first fluorescent coloring material and a second fluorescent coloring material, and completed the present invention. According to the present invention, the monomolecular state of the fluorescent coloring material that fluoresces at a predetermined wavelength is maintained according to the properties of the solvent and/or coloring material, even on a recording medium. In addition, the combination of a first and second fluorescent coloring materials according to the present invention allows increase in the concentration of the fluorescent coloring material in the ink to increase the fluorescence intensity. Furthermore, an energetic interaction between the first fluorescent coloring material and the second fluorescent coloring material can increase the fluorescence intensity. These effects can be exerted with an image formed with the ink on a recording medium as well as with a solution.

As described later, the print ink according to the present invention of the best dye combination is able to increase the PMU level of the recorded image (measured by using a LM-2C luminance meter as described in U.S. Pat. No. 6,176,908 B) at least by twofold in comparison with the conventional fluorescent ink (by threefold when the solvents are selected according to Aspect 3 described below).

Hereinafter, the print ink of the present invention will be described with reference to the drawings. Unless noted as a recorded image or a printed matter, the results are with an evaporated ink in which water was removed by evaporation and coloring materials are dispersed in an organic solvent. The print ink according to each embodiment of the present invention contains a first fluorescent coloring material that emits fluorescence of a predetermined wavelength that is used for measurement or determination, with excitation at a predetermined excitation wavelength, a second fluorescent coloring material that emits fluorescence with excitation at the same excitation wavelength, and a liquid medium for solving or dispersing these materials therein.

The first and second fluorescent coloring materials of the present invention can be pigments or dyes so long as the configuration of each embodiment is satisfied. Dyes are preferable for higher feathering rates and higher fluorescence intensities on the recording medium.

Specific examples of the dyes include: C.I. Basic Red 1, 2, 9, 12, 13, 14, and 17; C.I. Basic Violet 1, 3, 7, 10, 11:1, and 14; C.I. Acid Yellow 73, 184, and 250; C.I. Acid Red 51, 52, 92, and 94; C.I. Direct Yellow 11, 24, 26, 87, 100, and 147; C.I. Direct Orange 26, 29, 29:1, and 46; and C.I Direct Red 1, 13, 17, 239, 240, 242, and 254.

The total amounts of the respective first and second fluorescent coloring materials in the ink is, preferably, in the range of 0.01% by mass or more and 15% by mass or less, As shown in FIG. 1, when the AR52, the first fluorescent coloring material, is excited at 254 nm, the fluorescence spectrum shows a wide fluorescence region from 550 nm to ca. 675 nm with a peak at 600 nm. In other words, AR52 emits fluorescence not only at the predetermined emission wavelength of 600 nm as defined above, but also in the range of 580 nm to 620 nm both inclusive. On the other hand, the absorption band of AR52 in the visible region ranges from 460 nm to 610 nm with a peak at 565 nm, as shown in the bottom graph of FIG. 6.

The structure of the compound (A) is as follows:

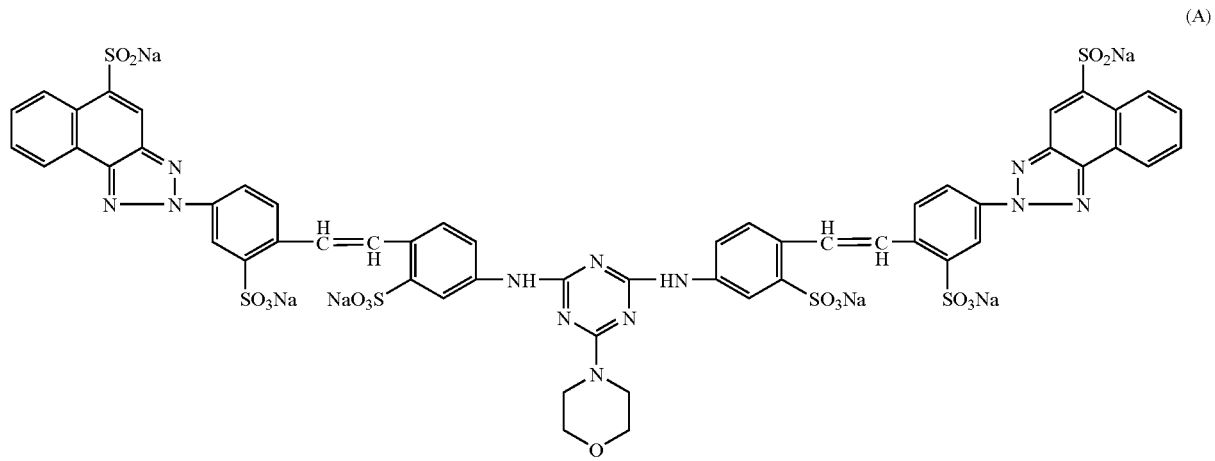

(A)

more preferably in the range of 0.05% by mass or more and 10% by mass or less of the total amount of the ink for practical use. According to the coloring materials, when the total amount of the coloring materials in the ink is not higher than 0.01% by mass, fluorescence intensity sufficient for a printed matter may not be obtained. When the ink is for ink jet recording, the discharge characteristics thereof may be affected when the total amount of the above materials is 15% by mass or more. In practical view, it is preferable that the amount of the first fluorescent coloring material be selected from the range of 0.01 to 1% by mass, and the amount of the second fluorescent coloring material may preferably be higher than that of the first fluorescent coloring material in the ink to improve the excitation energy efficiency further.

Some dyes in the above list are known to have weaker fluorescence at a concentration higher than a certain concentration, having a concentration region for strong fluorescence intensity. In such a case, it is preferable to use the dye in such a concentration region.

To improve the fluorescence intensity, it is preferable that the first and the second fluorescent coloring materials satisfy at least of one of the following Aspect 1 to Aspect 3. A combination of the first and second fluorescent can be selected from the coloring materials described above coloring materials according to the Aspect.

In the present invention, a most preferable example of the combination of fluorescent coloring materials is a combination of C.I. Acid Red 52 as the first fluorescent coloring material and the compound (A) described below as the second fluorescent coloring material. In the following description, but not limited to, the predetermined emission wavelength used for measurement or determination is 600 nm, although it may be a band or any wavelength in the range of 580 nm to 620 nm both inclusive.

Figure 3:
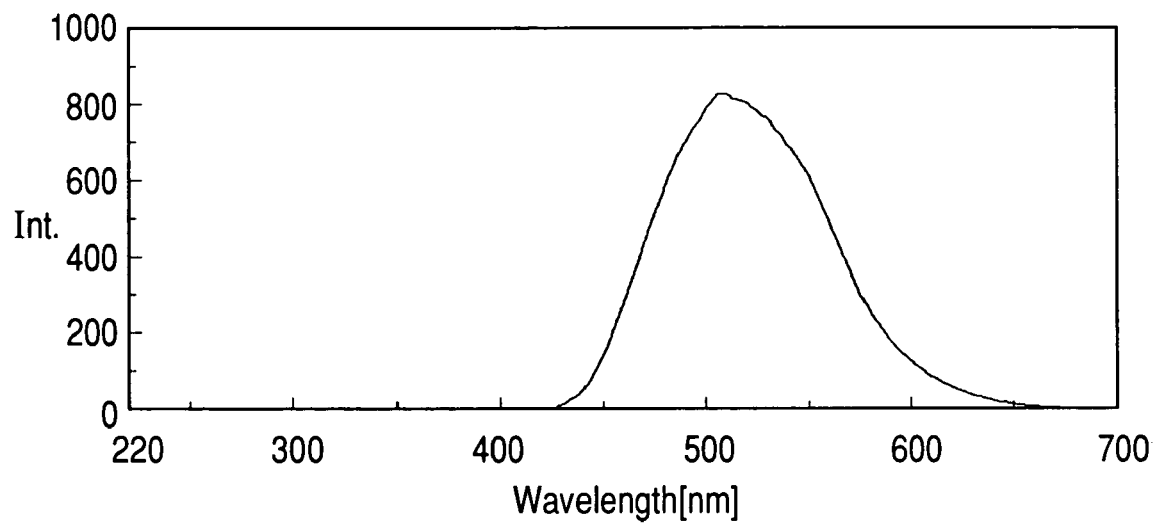
FIG. 3 shows a fluorescence spectrum of Compound (A) with excitation at 254 nm.

The compound (A) has a dimeric structure having plural emission groups. Thus, the compound (A) has an association-preventing function, and also the fluorescence intensity can be improved with increasing the amount of the compound (A). The compound (A) is a direct dye having sulfone groups and having poor water solubility (less than 2 wt % in pure water), while showing good solubility in organic solvents. As shown in FIG. 3, a fluorescence spectrum of the compound (A) on excitation at 254 nm shows a wide fluorescence emission region ranging from 425 nm to ca. 650 nm with a peak at 510 nm. Therefore, the more the compound (A) is added, the higher its fluorescence intensity becomes, so that the excitation energy for the first fluorescent coloring material increases. Furthermore, as shown in the bottom graph in FIG. 5, the absorption in visible region of the compound (A) is up to 440 nm having a peak at 380 nm, and it also has UV absorption. Therefore, even if the compound (A) is added in a substantially large amount, it will not spoil the fluorescence characteristics of the compound (A), the fluorescence intensity in the region corresponding to the excitation wavelength region for the first fluorescent coloring material, or the fluorescence characteristics of the first fluorescent coloring material.

Figure 7:
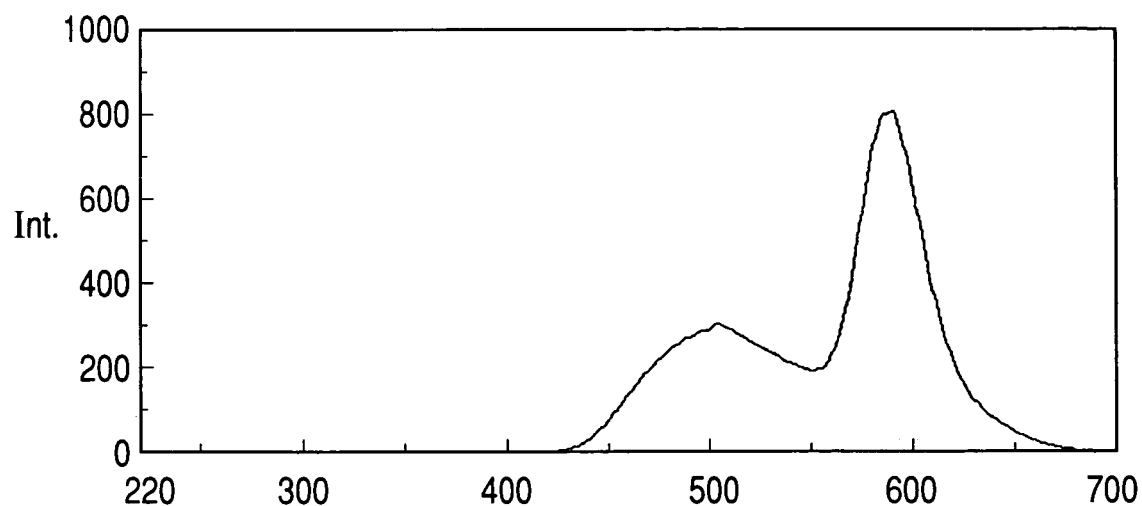
FIG. 7 shows a fluorescence spectrum of an ink containing a mixture of C.I. Acid Red 52 and the compound (A)

The preferable solvents for the ink are pure water that can dissolve the first fluorescent coloring material in a large amount, and an organic solvent that can dissolve the second fluorescent coloring material in a large amount. More preferably, a surfactant may be included in the liquid medium. Such a liquid medium serves for forming images where the first fluorescent coloring material is fixed in a monomolecular state and the first and second coloring materials are uniformly dispersed and fixed. As a result, when excited at 254 nm, the fluorescence characteristics of a recorded image (FIG. 8) is much improved in comparison with those of the evaporated ink (FIG. 7). Thus, the compound (A) is a preferable example having a structure and characteristics to achieve various objects of the present invention.

Hereinafter, the combination of C.I. Acid Red 52 as a first fluorescent coloring material and the compound (A) as a second fluorescent coloring material is described using a determination standard of a predetermined emission wavelength of 600 nm and a predetermined excitation wavelength of 254 nm, including embodiments of the present invention.

[Aspect 1]

Figure 2:
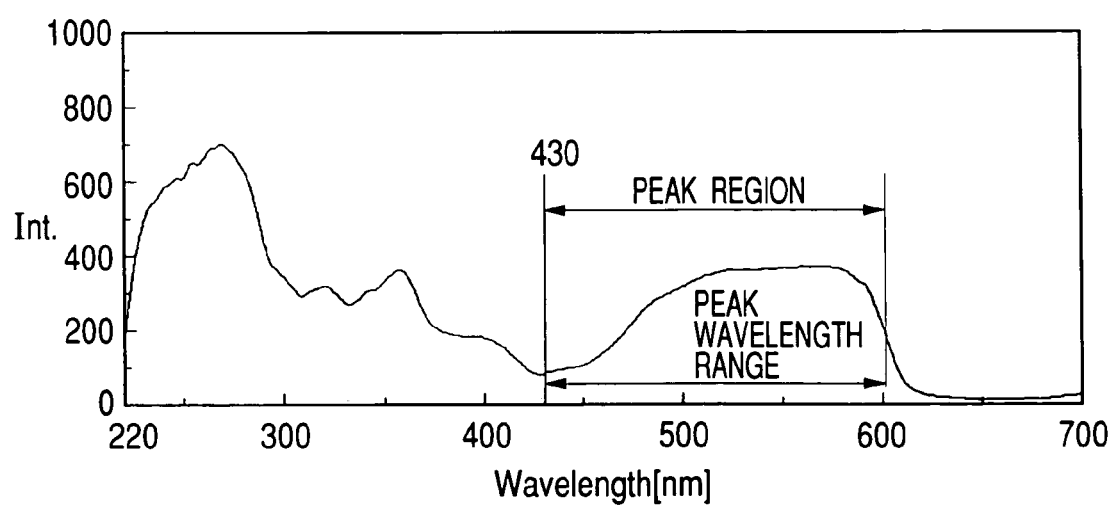
FIG. 2 shows an excitation spectrum of C.I. Acid Red 52 recorded at an emission wavelength of 600 nm.
Figure 6:
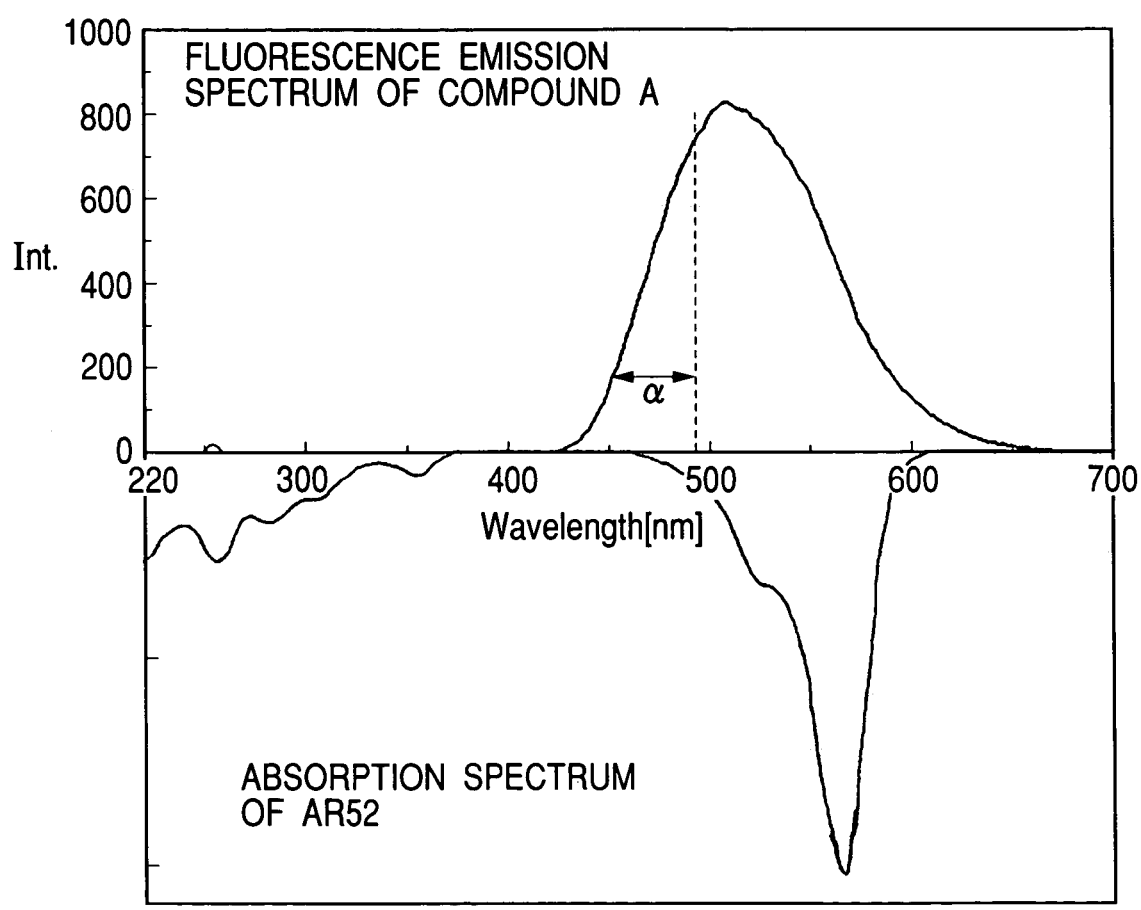
FIG. 6 shows a comparison between a fluorescence emission spectrum of the compound (A) with excitation at 254 nm and an absorption spectrum of C.I. Acid Red 52.

Aspect 1 is characterized in that the fluorescence emission wavelength region of the second fluorescent coloring material covers at least the peak wavelength range of the excitation spectrum of the first fluorescent coloring material measured for emission at 600 nm (see FIG. 2) and/or the absorption wavelengths in the visible region of the first fluorescent coloring material (see the bottom of FIG. 6). According to Aspect 1, the relative relation of wavelength regions is complementary or efficiency is improved. First, an evaporated ink was prepared as follows: a predetermined amount (in this case, 0.3% by mass of the solution) of C.I. Acid Red 52 (AR52) as the first fluorescent coloring material was dissolved in an aqueous solution (an organic solvent (e.g., glycerin) and pure water), and the solution was heated at 60° C. to completely evaporate water. When the evaporated ink was subjected to excitation at 254 nm using a measuring device (FP 750, manufactured by JASCO Corporation), the fluorescence emission spectrum was as shown in FIG. 1, and the excitation wavelength spectrum for a predetermined emission wavelength of 600 nm is shown in FIG. 2. FIG. 2 shows that the UV region of 380 nm or shorter has a peak region having a peak around 265 nm and a peak region having a peak around 360 nm, and also one peak region in the visible light region. Generally, the UV excitation wavelength to be used for calling is 254 nm or 365 nm. When the energy conversion efficiency was studied, it was found that when the excitation intensity, as plotted in the vertical axis of FIG. 2, is 100 or more, the determination is effective, that is, the intensity is sufficient for calling. Therefore, "the peak wavelength range corresponding to the peak region next to the predetermined emission wavelength" of the fluorescence emission of the first fluorescent coloring material in the present invention has a practical meaning in consideration of the above energy conversion efficiency. In other words, in the "excitation wavelength spectrum for obtaining emission at the predetermined wavelength" of the first fluorescent coloring material (FIG. 2), "peak region" is a region of which intensity is 100 or more in the spectrum having a peak next to the predetermined fluorescence wavelength. A range of the wavelength corresponding to this region is a peak wavelength range. Therefore, in FIG. 2, when the predetermined fluorescence wavelength of AR52 is 600 nm (the predetermined excitation wavelength: 254 nm), the peak wavelength range thereof is from 430 nm to 600 nm both inclusive. On the other hand, as shown in FIG. 3, the compound (A) provided as a second fluorescent coloring material has a main fluorescence emission ranging 450 nm to 600 nm both inclusive almost covering the peak wavelength range of 430 nm to 600 nm both inclusive. From each of the figures, when the above fluorescence intensity is set to 100, it can be also understood that the compound (A) fluoresces to satisfy such a range.

Figure 4:
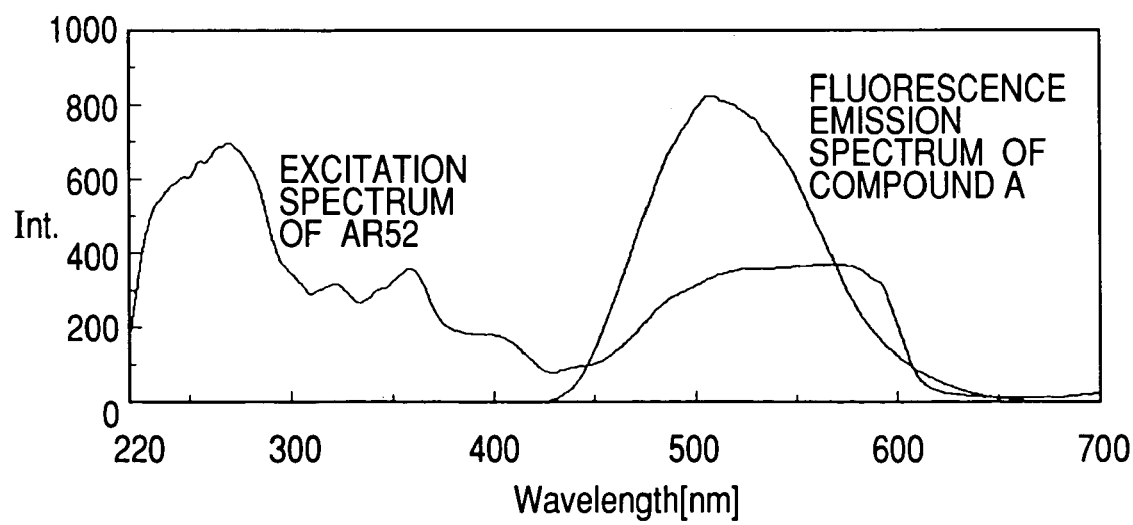
FIG. 4 shows a comparison between the excitation spectrum of C.I. Acid Red 52 recorded at an emission wavelength of 600 nm and the fluorescence emission spectrum of the compound (A) with excitation at 254 nm.

FIG. 4 is a graph showing the relationship between fluorescence emission wavelength characteristics of the compound (A) and an excitation wavelength for obtaining the emission of AR52 at 600 nm, where the excitation wavelength spectrum (FIG. 2) of the first fluorescent coloring material and the emission spectrum (FIG. 3) of the second fluorescent coloring material are superimposed. As can be understood from FIG. 4, in comparison with the fluorescence intensity of AR52 at the wavelength of 600 nm at which emission intensity of AR52 is maximum as shown in FIG. 1, the maximum emission intensity of the compound (A) is as high as 800 or more at the wavelength of 510 nm. Referring to these figures, this embodiment can be understood. Therefore, the emission wavelength of the second fluorescent coloring material includes the peak wavelength range of the first fluorescent coloring material, so that the energy conversion can be efficiently performed, and the fluorescence intensity at the predetermined fluorescence wavelength can be improved synergistically on excitation at a predetermined excitation wavelength.

Figure 5:
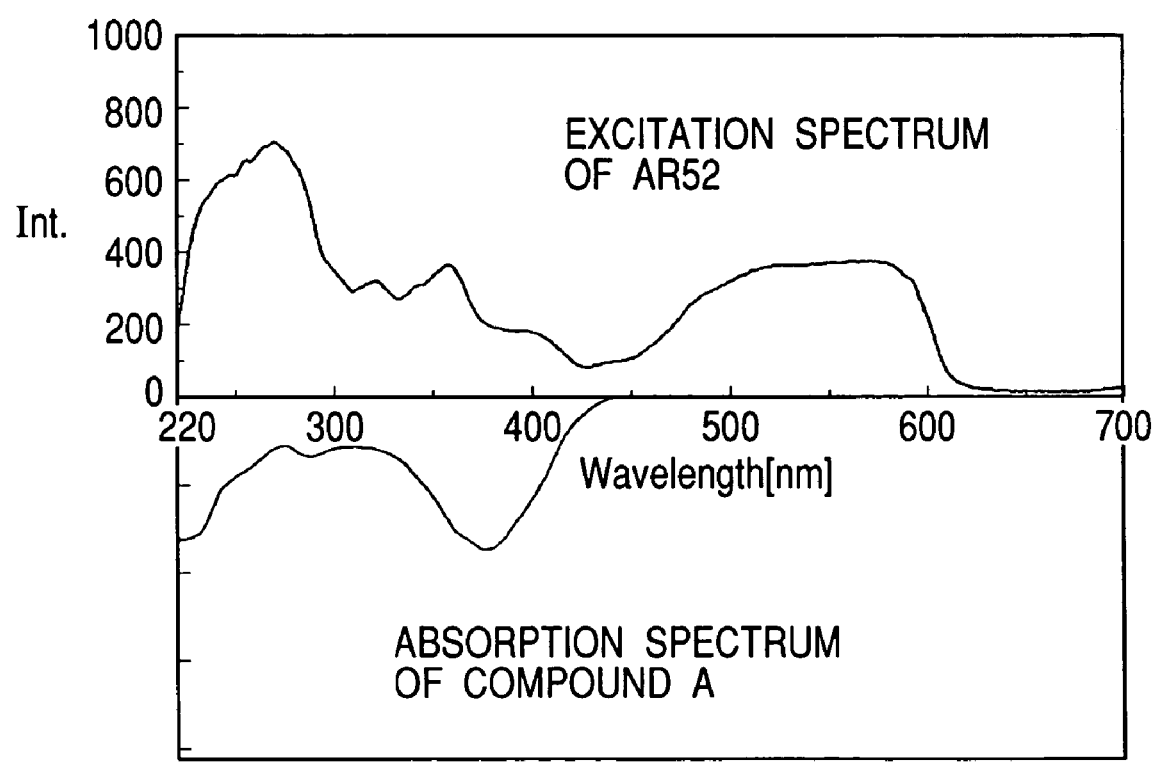
FIG. 5 shows a comparison between the excitation spectrum of C.I. Acid Red 52 recorded at 600 nm, and an absorption spectrum of the compound (A)

Next, the absorption spectrum of a-coloring material to be used should be taken into consideration of loss. FIG. 5 shows the excitation spectrum of AR52 for fluorescence emission at 600 nm (the upper graph) and a light absorption spectrum of the compound (A) (the lower graph), where the upper and lower graphs are compared with each other with the same wavelength scale. Here, the absorption and the excitation cannot be quantitatively compared with each other, but the relative relation therebetween can be found. Generally, the absorption band overlaps partially with the emission band, but shifting toward shorter wavelength. The light absorption spectrum of the compound (A) also overlaps with the fluorescence emission wavelength region shown in FIG. 3, showing absorption at a wavelength of 440 nm or shorter. The absorption spectrum has practical meaning around the peaks. Therefore, it is preferable that the wavelength region including the maximum absorption wavelength (380 nm) of the compound (A) does not overlap with the main excitation wavelength region of AR52 ranging from 425 nm to 600 nm both inclusive where the fluorescence intensity is 100 or more, more preferably no overlap between the main absorption region of 425 nm or shorter and the main excitation region of AR52. Anyway, the absorption band of the compound (A) does not overlap with the peak wavelength range of AR52, so that the absorption band does not directly affect the above energy conversion.

If a large percentage of the emission of the second fluorescent coloring material corresponding to the excitation wavelength region of the first fluorescent coloring material is absorbed by the second coloring material by itself, it will be a loss in improvement of fluorescence intensity.

Since the wavelength range of the fluorescence emission of the compound (A) overlaps with the excitation wavelength range of AR52 effective to obtain emission at the predetermined wavelength, the emission from the compound (A) is utilized to excite AR52. In addition, the absorption by the compound (A) does not lower the efficiency of the energy conversion. Therefore, the fluorescence emission from the second fluorescent coloring material becomes new excitation energy for the first fluorescent coloring material, for enhancing fluorescence.

As is evident from a comparison between FIG. 1 and FIG. 3, the fluorescence emission of AR52 and the fluorescence emission of the compound (A) overlap in a wavelength range of, at least, 580 nm or more and 620 nm or less. The overlap provides a more effective relationship for the determination at the predetermined emission wavelength.

Next, the feature of the present invention with respect to the absorption spectrum of the first fluorescent coloring material is described. FIG. 6 is a graph incorporating the absorption spectrum of AR52 (the lower graph) and the fluorescence emission spectrum of the compound (A) (the upper graph) on the same wavelength scale. The absorption spectrum of AR52 can be considered to show the energy loss to the fluorescence emission of the compound (A). The absorption spectrum of AR52 has a main peak near 560 nm ranging from 600 nm to 460 nm both inclusive in the visible light region. The range of substantial absorption of AR52 is narrower than the above, ranging from 500 nm to 590 nm both inclusive. Considering the range of the fluorescence emission of AR52 (550 nm or more) and the intensity thereof as shown in FIG. 1, absorption is considered to occur in the range of 500 nm to 560 nm both inclusive. Since this absorption band is present in the visible light region, it has been kept out of the technical argument on the fluorescence emission of AR52. However, since different fluorescent coloring materials are used in the present invention, this absorption band has become a point of consideration in the two-stage excitation energy conversion. That is, once this absorption band is recognized, a solution is that the fluorescence emission of the second fluorescent coloring material is in a range covering the excitation wavelength of AR52 for obtaining emission at the predetermined fluorescence wavelength, but not including this absorption range. FIG. 6 shows this relationship. As can be recognized from the upper and lower graphs in FIG. 6, the main fluorescence emission of the compound (A) is in a range of 430 nm to 515 nm both inclusive, not affected by the absorption band. The fluorescence emission of the compound (A) includes a fluorescence emission range designated as a in FIG. 6 (430 nm$\leq\alpha<$500 nm) in a wavelength range not overlapping with the substantial absorption band of AR52 ranging from 500 nm to 590 nm both inclusive having a peak at 560 nm. The light energy of this region $\alpha$ is used as extra excitation energy for the first fluorescent coloring material. Therefore, the entire fluorescence intensity at the predetermined emission wavelength can be enhanced. In other words, the region $\alpha$ contributes to the improvement of fluorescence intensity of AR52, because at least the region $\alpha$ overlaps with the second excitation wavelength region of AR52.

Figure 10:
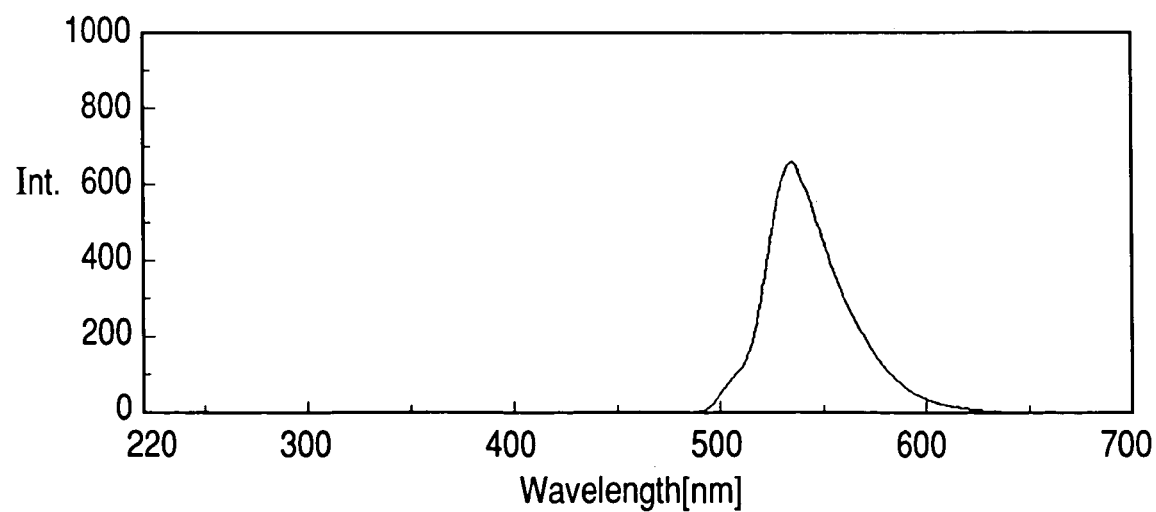
FIG. 10 shows a fluorescence emission spectrum of C.I. Acid Yellow 73 with excitation at 254 nm.

Next, as a reference example, a combination of C.I. Acid Yellow 73 (AY73) and AR52 will be explained with reference to FIGS. 10 to 13, a combination described in U.S. Pat. No. 6,176,908 B. In each figure, the evaporated ink was used when UV light was applied, while the absorption was measured with the normal ink. As shown in FIG. 10, AY73 emits fluorescence in a wavelength region of about 500 to 600 nm both inclusive (peak: 530 nm) when excited at a predetermined excitation wavelength of 254 nm.

Figure 11:
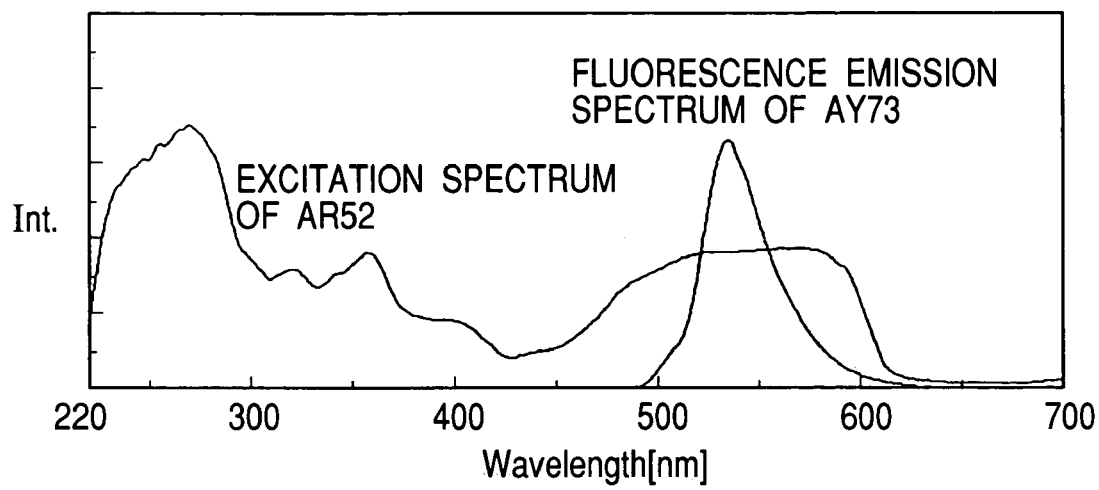
FIG. 11 shows a comparison between the excitation spectrum of C.I. Acid Red 52 recorded at 600 nm and the fluorescence emission spectrum of C.I. Acid Yellow 73 with excitation at 254 nm.

In FIG. 11, the fluorescence spectrum of AY73 of FIG. 10 is superimposed on the excitation spectrum of AR52 shown in FIG. 2. As seen from this figure, the fluorescence emission of AY73 is in a wavelength region of about 500 to 600 nm both inclusive (peak: 530 nm), and the wavelength range with the effective emission intensity is narrow. The fluorescence emission range of AY73 is inside the peak excitation wavelength range of A52 (475 nm to 600 nm both inclusive). Therefore, AY73 does not emit fluorescence enough to make AR52 fluoresce.

Figure 12:
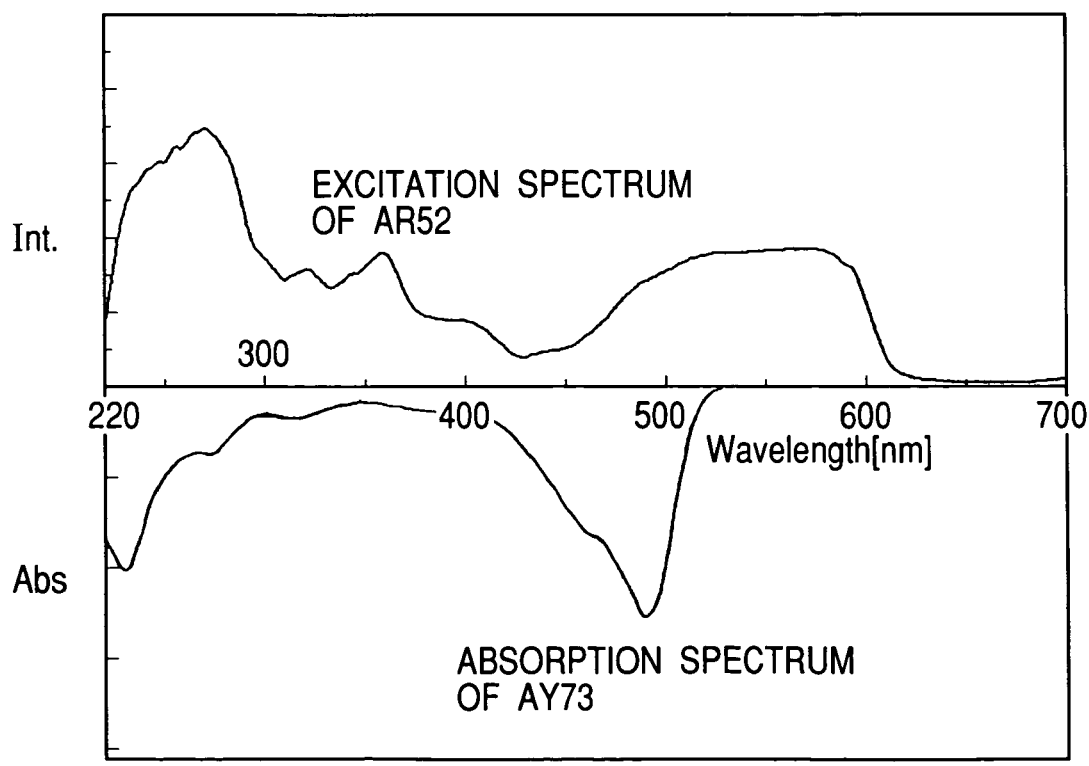
FIG. 12 shows a comparison between the excitation spectrum of C.I. Acid Red 52 recorded at 600 nm and an absorption spectrum of C.I. Acid Yellow 73.

FIG. 12 shows a comparison between the excitation spectrum of AR52 for obtaining emission at 600 nm and a light absorption spectrum of AY73. The light absorption band of AY73 is in the visible light region of not higher than 525 nm and has a peak at 490 nm. When an ink contains the compound (A) and both of AR52 and AY73, as an example of the present invention, AY73 acts to lower the effect of the compound (A) according to the light absorption spectrum.

Therefore, it is necessary to increase the addition amount of the compound (A) as much as desired (see Aspect 2 described below) and to compensate the loss due to the absorption by AY73. Furthermore, as shown in FIG. 12, the maximum absorption wavelength (490 nm) of AY73 is present in the excitation wavelength region (450 nm to 600 nm both inclusive) of AR52.

Figure 13:
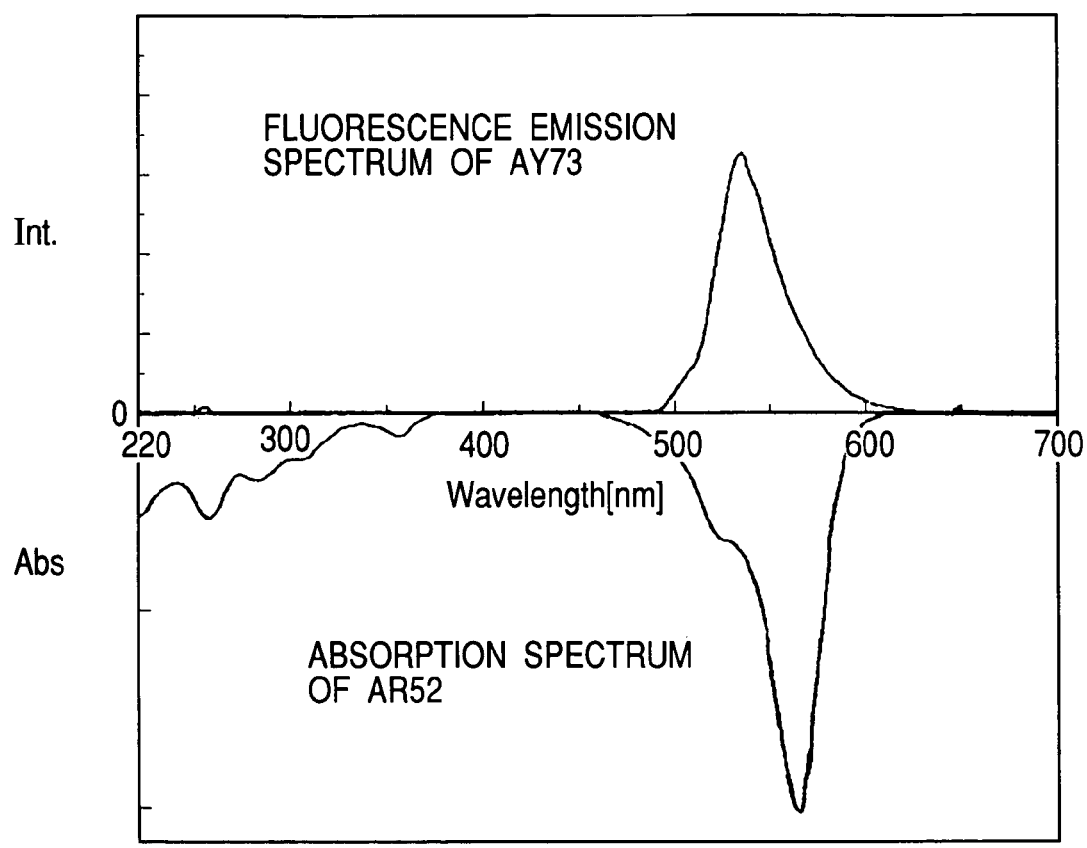
FIG. 13 shows a comparison between a fluorescence spectrum of C.I. Acid Yellow 73 with excitation at 254 nm and the absorption spectrum of C.I. Acid Red 52.
Figure 14:
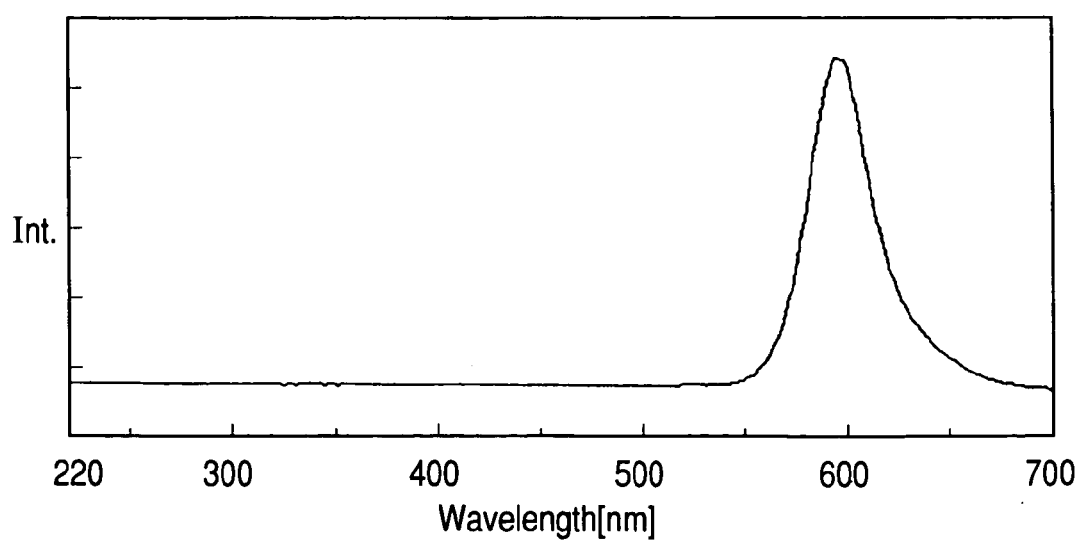
FIG. 14 shows a fluorescence emission spectrum of C.I. Basic Violet 10 with excitation at 254 nm.
Figure 15:
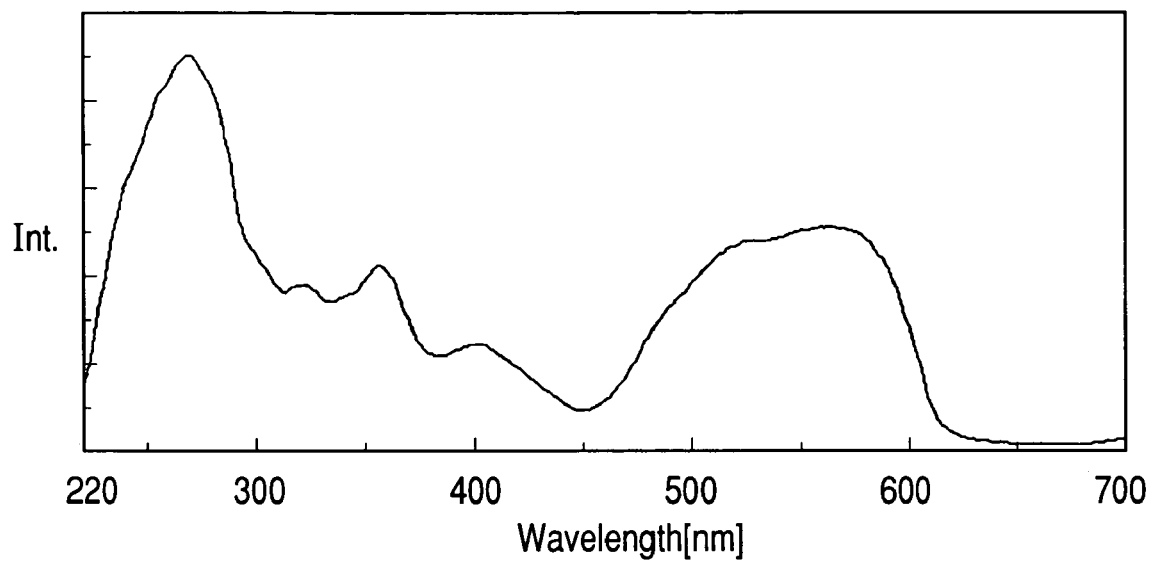
FIG. 15 shows an excitation spectrum of C.I. Basic Violet 10 recorded at 600 nm.
Figure 16:
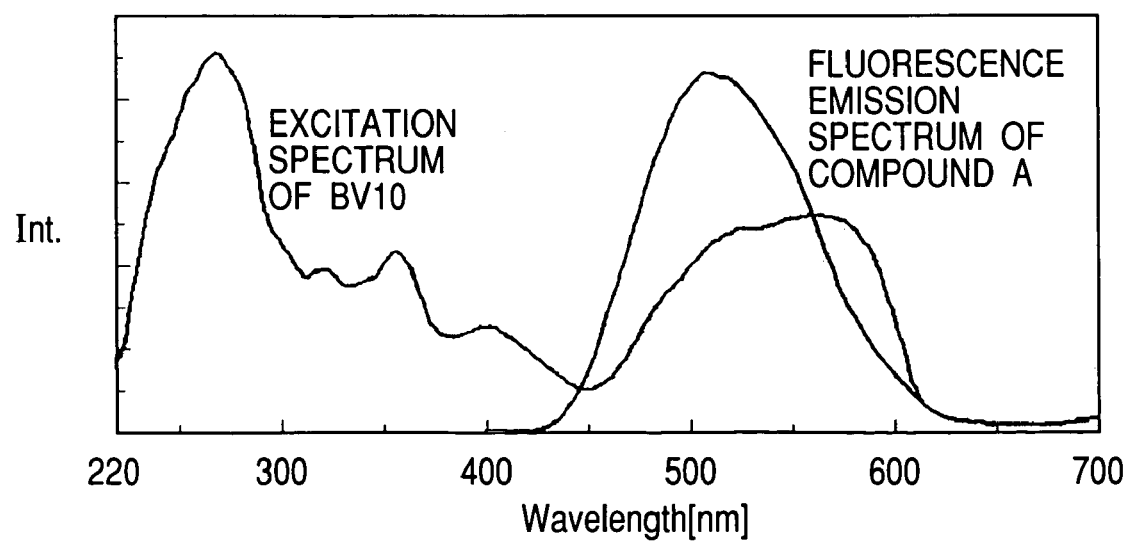
FIG. 16 shows a comparison between the excitation spectrum of C.I. Basic Violet 10 at 600 nm and the fluorescence emission spectrum of the compound (A) with excitation at 254 nm.
Figure 17:
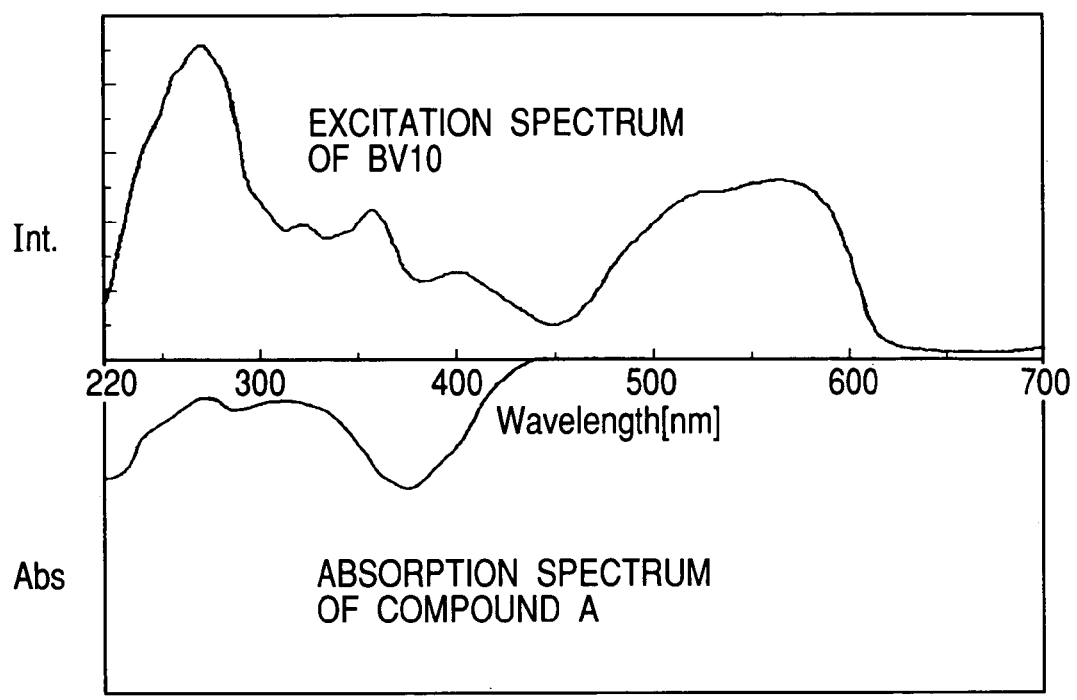
FIG. 17 shows a comparison between the excitation spectrum of C.I. Basic Violet 10 recorded at 600 nm and the absorption spectrum of the compound (A)
Figure 18:
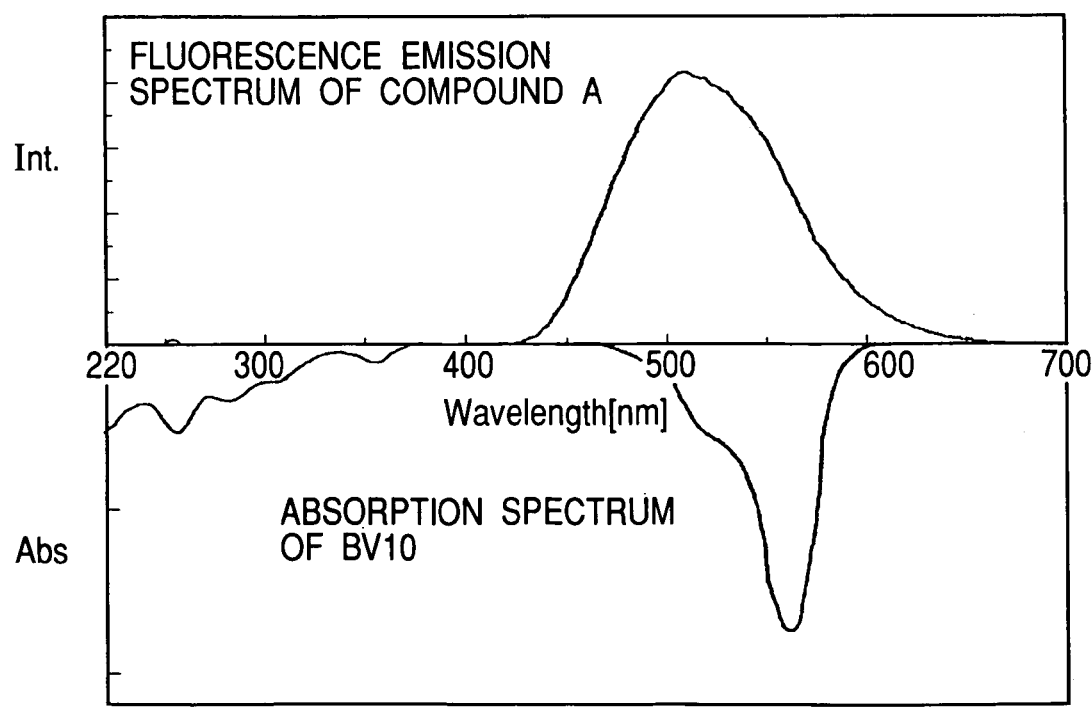
FIG. 18 shows a comparison between the fluorescence spectrum of the compound (A) with excitation at 254 nm and an absorption spectrum of C.I. Basic Violet 10.
Figure 19:
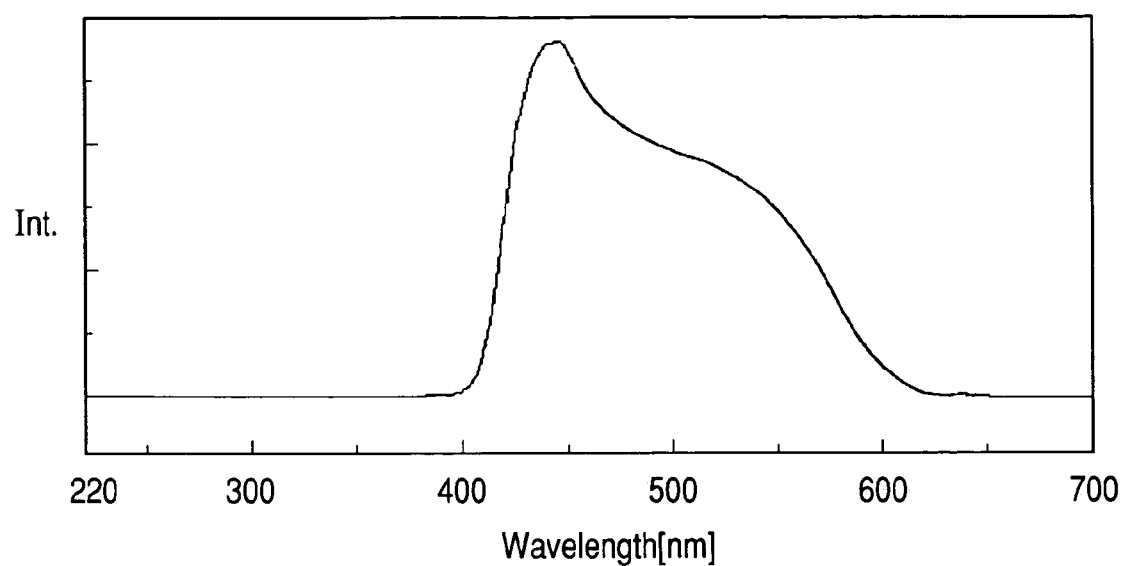
FIG. 19 shows a fluorescence emission spectrum of C.I. Solvent Green 7 with excitation at 254 nm.
Figure 20:
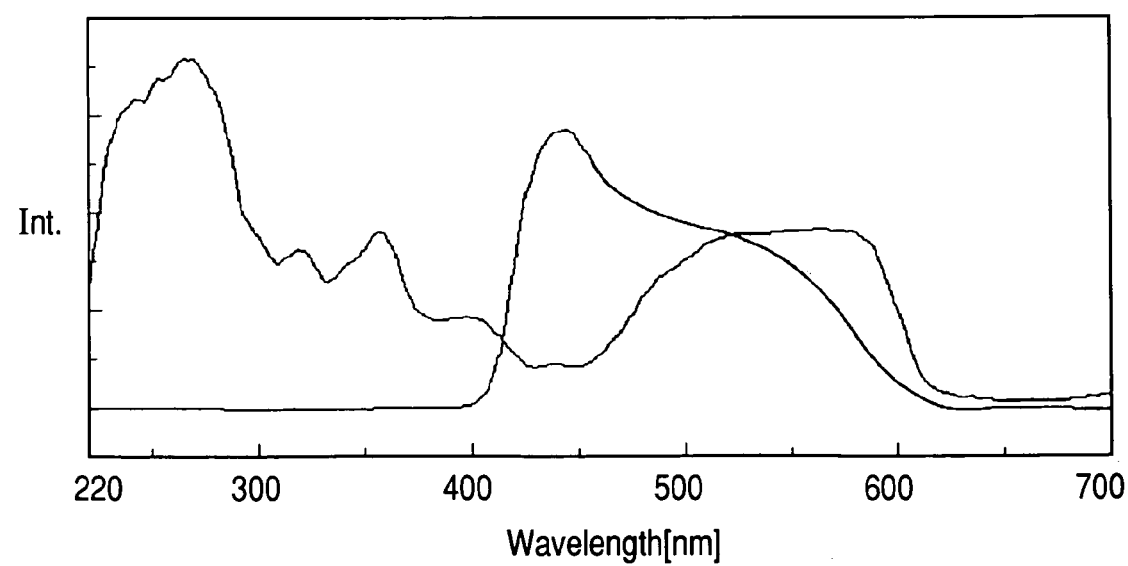
FIG. 20 shows a comparison between the excitation spectrum of C.I. Acid Red 52 recorded at 600 nm and the fluorescence emission spectrum of C.I. Solvent Green 7 with excitation at 254 nm.
Figure 21:
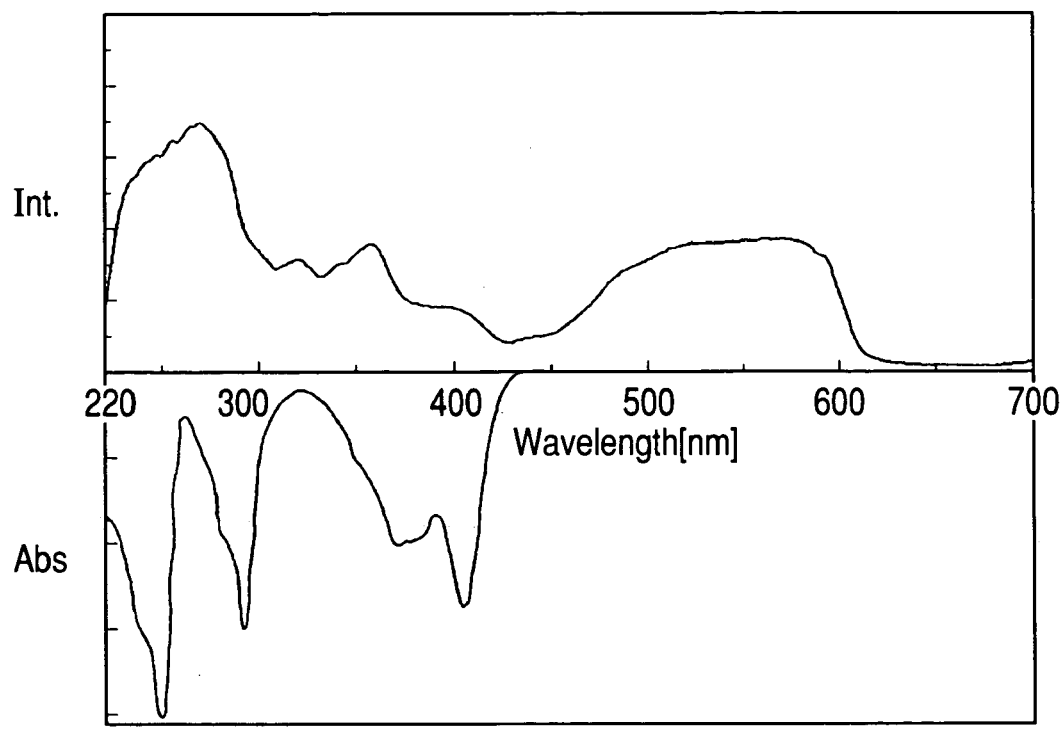
FIG. 21 shows a comparison between the excitation spectrum of C.I. Acid Red 52 recorded at 600 nm and an absorption spectrum of C.I. Solvent Green 7.
Figure 22:
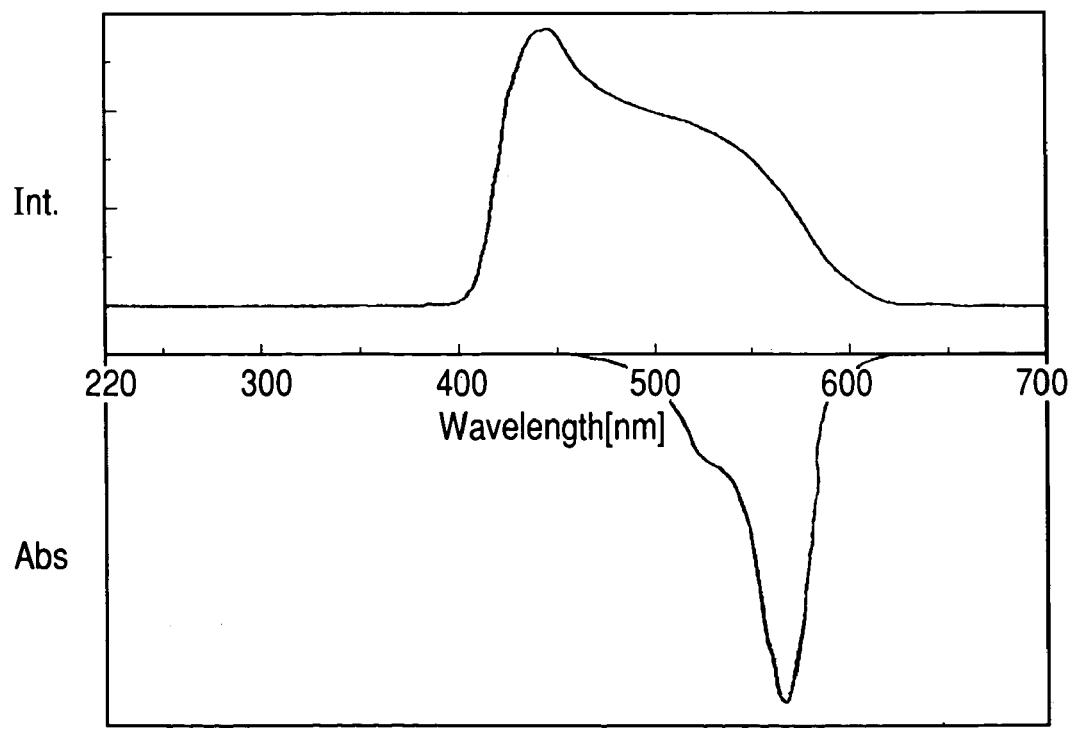
FIG. 22 shows a comparison between the fluorescence spectrum of C.I. Solvent Green 7 excited at 254 nm and an absorption spectrum of C.I. Acid Red 52.
Figure 23:
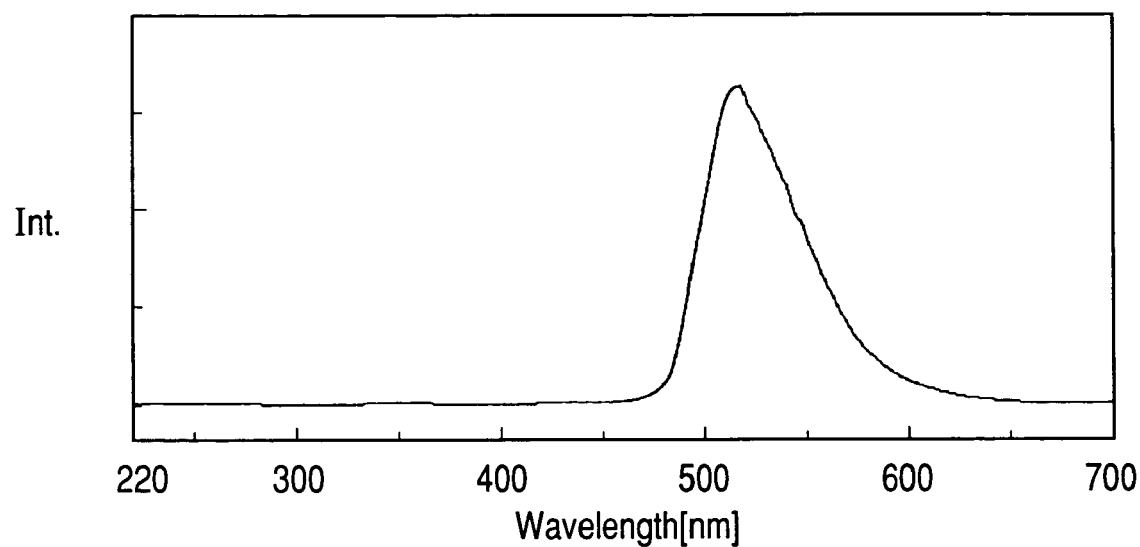
FIG. 23 shows a fluorescence emission spectrum of C.I. Acid Yellow 184 with excitation at 254 nm.
Figure 24:
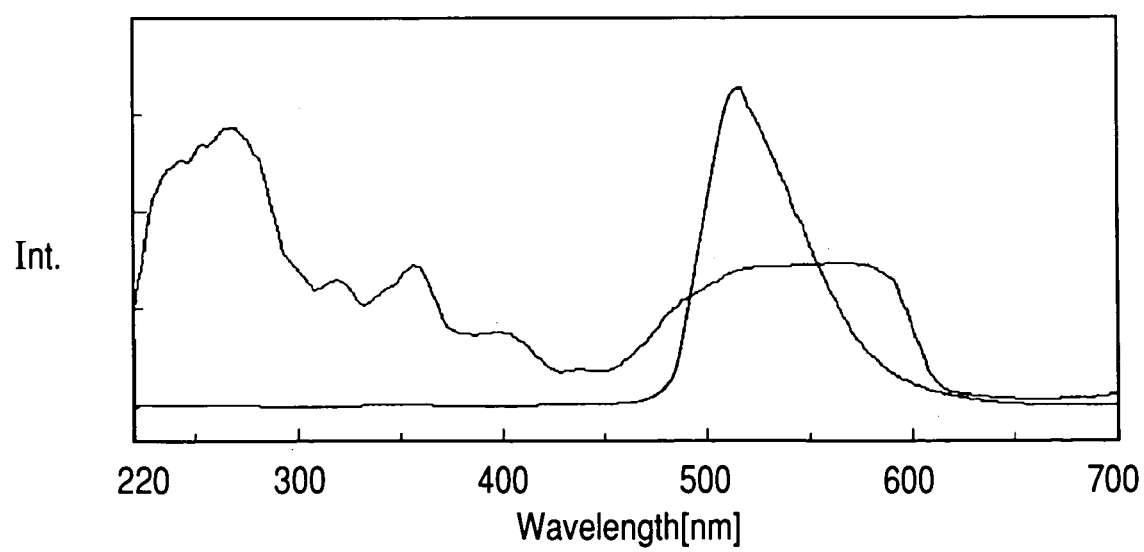
FIG. 24 shows a comparison between the excitation spectrum of C.I. Acid Red 52 recorded at 600 nm and the fluorescence emission spectrum of C.I. Acid Yellow 184 excited at 254 nm.
Figure 25:
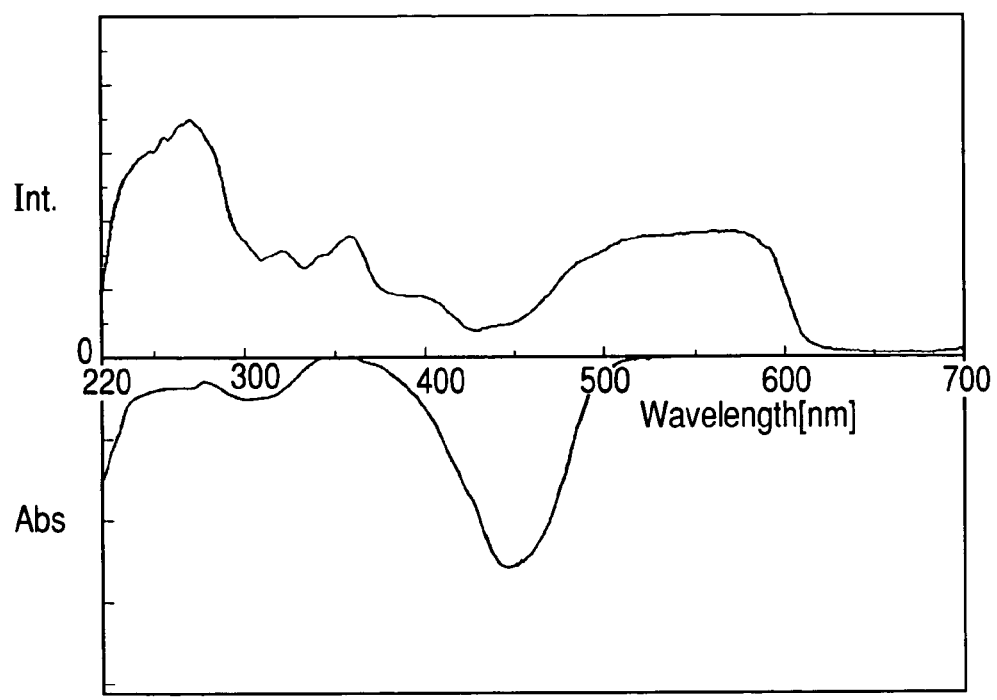
FIG. 25 shows a comparison between the excitation spectrum of C.I. Acid Red 52 recorded at 600 nm and an absorption spectrum of C.I. Acid Yellow 184.
Figure 26:
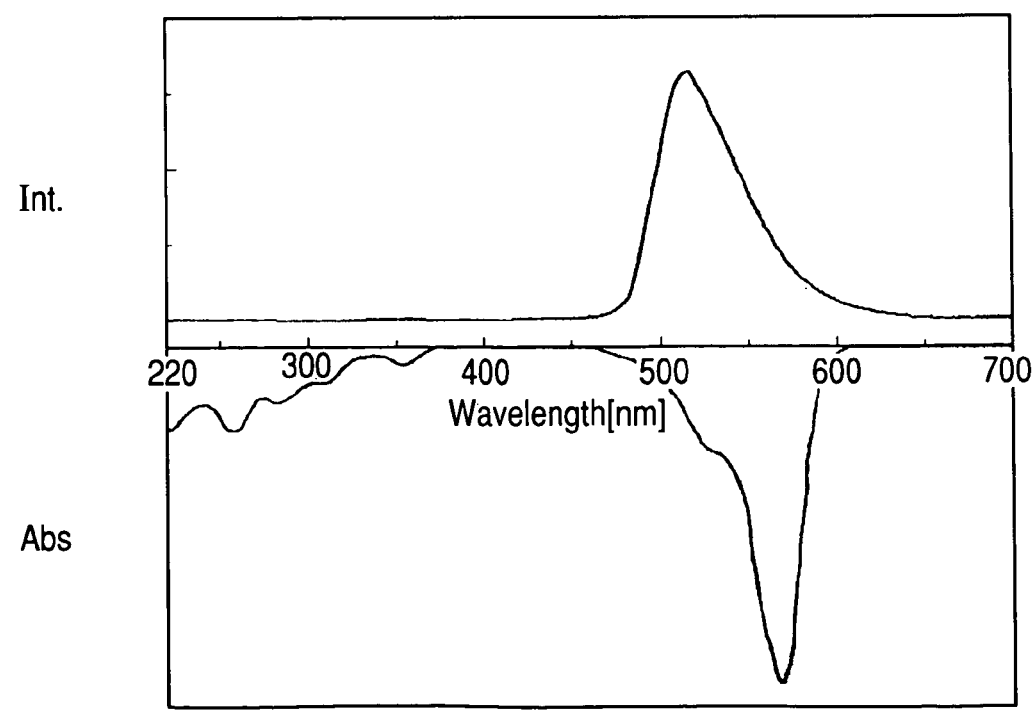
FIG. 26 shows a comparison between the fluorescence emission spectrum of C.I. Acid Yellow 184 excited at 254 nm and the absorption spectrum of C.I. Acid Red 52.

FIG. 13 shows a combination of the absorption spectrum of AR52 shown in the lower graph of FIG. 6 and the fluorescence spectrum of AY73. As seen from FIG. 13, the fluorescence band of AY73 is included in the substantial absorption region (500 nm to 590 nm both inclusive) of AR52, and no emission wavelength is observed at shorter wavelengths than the above absorption region. Therefore, the combination of only AR52 and AY73 does not disclose any of the configurations of the present invention described above and does not provide the advantage of present invention.

Figure 8:
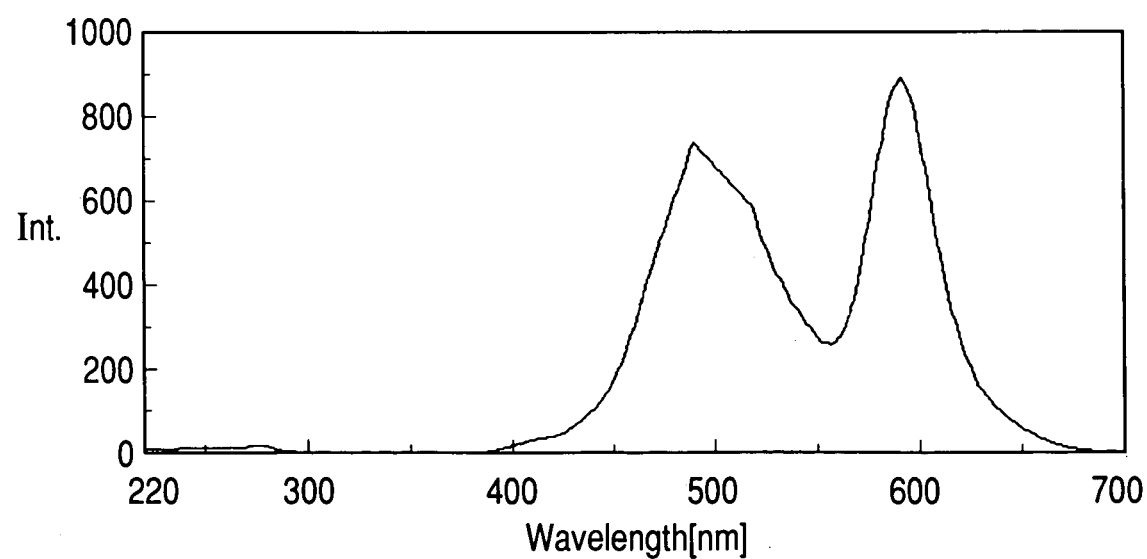
FIG. 8 shows a fluorescence spectrum of a printed matter with the ink containing a mixture of C.I. Acid Red 52 and the compound (A)

Referring back to FIGS. 7 and 9, the present invention will be further described in view of ink and a recorded image. FIG. 7 represents the measurements obtained by preparing recording ink that contains both AR52 and the compound (A), pure water, and an organic solvent, followed by exciting the recording ink as the evaporated ink at a predetermined excitation wavelength of 254 nm by the FP-750. FIG. 8 represents the measurements obtained by exciting an image recorded on a recording medium using the recording ink at a predetermined excitation wavelength of 254 nm by the FP-750. In other words, FIG. 7 shows the results of studying the characteristics of the recording ink of the present invention with evaporated ink, and FIG. 8 shows the characteristics of a recorded image with the recording ink of the present invention, and the use of the recording ink of the present invention can be proved in terms of the recorded image.

The effects of the present invention will be confirmed by comparing FIG. 7 and FIG. 8. This is because the same ink is used in those figures, which is effective in a relative comparison. In each of FIG. 7 and FIG. 8, the graph has two peaks in the vicinity of 500 nm and at 590 nm, respectively. As is evident from each of FIG. 1 and FIG. 3 described above, the compound (A) provides a peak at approximately 500 nm, and AR52 provides a peak at 590 nm. As can be seen from the comparison between FIG. 7 and FIG. 8, with respect to FIG. 7 showing AR 52 and the compound (A) which are in an ideal dissolution state, a recorded image receives a further increase in fluorescence intensity, particularly an increase in fluorescence intensity of the predetermined emission wavelength (600 nm, or the whole range of 580 nm to 620 nm). Those facts prove the following. In the recorded image, each of the coloring materials utilizes the predetermined excitation wavelength efficiently, and the emission from the compound (A) provided as a second fluorescent coloring material and the emission from the first fluorescent coloring material using the emission from the compound (A) can be obtained. Generally, when the fluorescent coloring materials are associated with each other, a peak wavelength is shifted toward longer wavelengths. However, in the comparison between FIG. 7 and FIG. 8, there is no shift as above. Thus, the absence of such a shift means that the association-preventing action of the present invention and other technological contents were proved as a result. FIG. 7 shows a result obtained by investigating the characteristics of the recording ink of the present invention with the evaporated ink. FIG. 8 shows the characteristics of the recorded image with the recording ink of the present invention, proving the use of the recording ink of the present invention in terms of the recorded image.

Furthermore, the evaporated ink that contains both of AR52 and the compound (A) has two peaks as shown in FIG. 7. Therefore, it is evident that the compound (A) compensates all characteristics of AR52 even in the case of using recording ink, and the fluorescence emission of the compound (A) exerts its characteristics enough to enhance the predetermined emission wavelength. In addition, as shown in FIG. 8, the recorded image has two peaks, so that there is shown that the fluorescence ink in which the concentration quenching can be hardly generated is completed and durability that continues to enhance the fluorescence intensity in the long term is provided.

Figure 9:
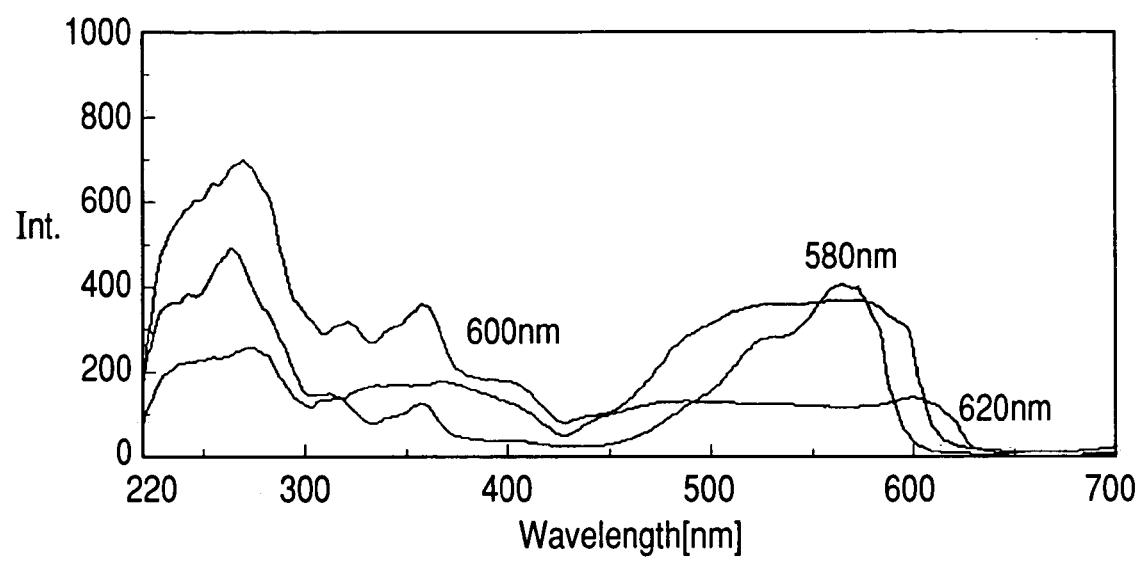
FIG. 9 shows excitation spectra of C.I. Acid Red 52 recorded at fluorescence emission wavelengths of 580, 600, and 620 nm, respectively.

Note that the predetermined fluorescence wavelength in the present invention can be selected depending on the application of the ink and images formed with the ink. For example, FIG. 9 shows the excitation spectra of AR52 obtained using fluorescence emission wavelengths (predetermined fluorescence wavelength) of 580, 600, and 620 respectively. Thus, the peak wavelength range corresponding to the peak region next to each predetermined fluorescence wavelength can be defined according to the present invention. As described above, when the predetermined emission wavelength is defined as a band ranging from 580 nm to 620 nm inclusive, it is preferable that the emission wavelengths of the second fluorescent coloring material on excitation at the predetermined excitation wavelength covers most of the peak wavelength ranges of the excitation spectra. In this case, however, in order to obtain an efficiency level higher than the prior arts, the emission wavelength may be a single wave of high efficiency, or preferably it may be a broader band, e.g., 600 nm ±5 nm or ±10 nm, when the predetermined emission wavelength is defined as a certain wavelength range. That is, the fluorescence emission wavelength sufficiently includes wavelengths in the excitation spectrum at which the predetermined fluorescence emission is obtained efficiently. For instance, in the case of AR52, as shown in FIG. 9, it is more efficient to satisfy the peak wavelength range of the excitation spectrum for an emission wavelength of 600 nm as described above, not of the excitation spectra for 580 nm and 620 nm. The effects of Aspect 1 above can be naturally enhanced if the addition amount of the second fluorescent coloring material can be increased.

[Aspect 2]

Aspect 2 relates to the conventionally not recognized characteristic requirement in the structure of the second fluorescent coloring material, which allows increased addition of the second fluorescent coloring material to the ink. That is, the conditions for wavelengths described in Aspect 1 for the second fluorescent coloring material are eased such that at least a part of the fluorescence wavelength region overlaps with the excitation spectrum of the first coloring material. The energy relationship between the excitation wavelength and the emission wavelength can be improved by increasing the addition amount of the second fluorescent coloring material. More specifically, the addition amount of the second fluorescent coloring material can be increased while preventing molecular association of the first coloring material with a basic structure of the second coloring material that hinders molecular association of the coloring materials. As a result, the fluorescence intensity at the predetermined emission wavelength can be enhanced. The intensity of the fluorescence emission of the first fluorescent coloring material at the predetermined excitation wavelength can be improved by using a combination of the first and second fluorescent coloring material at least one of which, preferably the second fluorescent coloring material, has a basic structure of the following atoms or atomic groups, or of the following fluorescence group.

In particular, the structure of a coloring material preferably has the plurality of fluorescence groups. That is, a coloring material having a plurality of fluorescence groups in the same molecular structure is large structurally, and shows an enhanced three-dimensional property, compared with the conventional fluorescent coloring material. Thus, it becomes difficult to aggregate or associate the coloring material with regularity as compared to the conventional fluorescent coloring material. Therefore, even if the content of the fluorescent coloring material in the ink is increased compared with that of the conventional coloring material, it is difficult to decrease the fluorescence intensity. Furthermore, a coloring material having a plurality of fluorescence groups in the same molecular structure contains a plurality of fluorescence groups in the single molecule of the coloring material. Thus, the fluorescence emission per molecule becomes strong, so that the intensity of fluorescence emission can be enhanced. In addition, as described above, compared with the conventional fluorescent coloring material, the fluorescent coloring material of the present invention is structurally large, and shows an enhanced three-dimensional property, so that the coloring materials can be easily absorbed on the components of the recording material, resulting in good water-resistance. Furthermore, when the fluorescent coloring material has substantivity, its water-resistance can be improved and also the substantivity can contribute to the durability of fluorescence emission. Furthermore, the coloring material having a plurality of fluorescence groups in the same molecular structure hardly aggregates or associates with regularity, compared with the conventional coloring material. Therefore, for example, even if the water content in the ink is evaporated, the aggregation of the coloring material hardly has regularity. Accordingly, a strong aggregation state is hardly caused, so that excellent sticking resistance can be obtained. This mechanism allows the ink of the present invention to have good fluorescence intensity and water-resistance. In addition, the coloring material having a plurality of fluorescence groups in the same molecular structure further improves the effects of the present invention using a sulfonic acid with a strong affinity to water as a hydrophilic group.

Furthermore, a preferable fluorescence group that satisfies the above requirements and is functionally effective may be an aminostilbene disulfonic acid derivative. The structure of the compound (A) also contains this derivative.

In the case of a fluorescent coloring material such as the conventional coloring material, even if the concentration of the coloring material is increased in ink, the fluorescence intensity of the coloring material may not be increased, but the fluorescence intensity may be decreased. In the case of using such a fluorescent coloring material, the applicable concentration range (content in the ink) is narrowed, and there is a limit to raising fluorescence intensity. On the other hand, in a combination of the first and second fluorescent coloring materials according to the present invention which bring color emission into visible light, the fluorescence intensity can be further increased when the content of the fluorescent coloring material is increased depending on an increment of the content.

Examples of fluorescence groups of the fluorescent coloring material of the present invention, with atomic groups and groups having fluorescence brightness functions, are shown below. Here, the fluorescent coloring material of the present invention may have a light absorption wavelength region in the visible light region or other regions, but it is important it fluoresces in the visible light region to give emission corresponding to the excitation wavelength region.

Fluorescence Groups

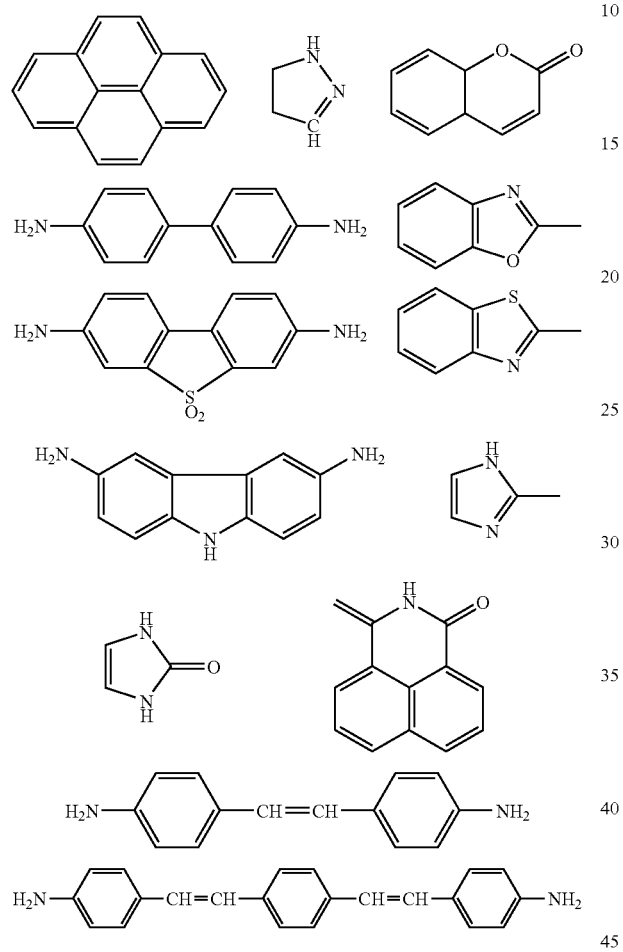

Connecting Group (1)

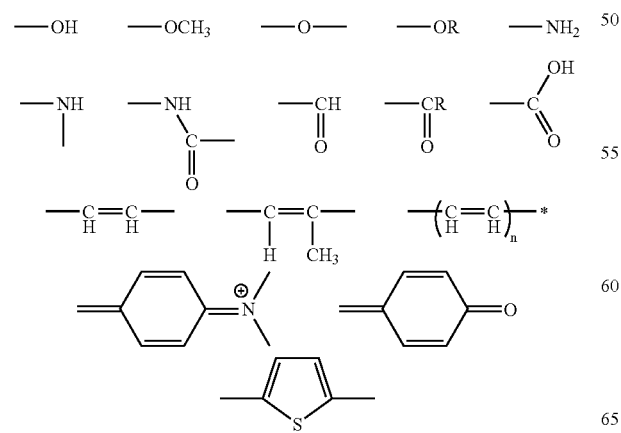

Connecting Group (2)

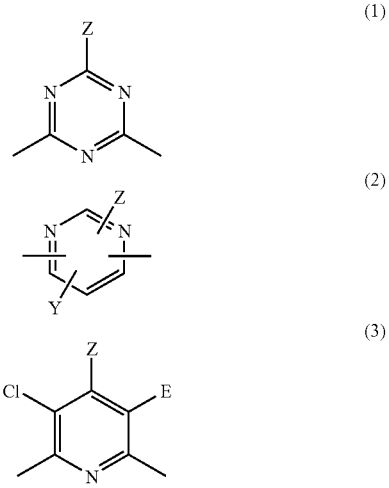

In the above formulae (1) to (3), Z represents independently $NR_1R_2$, $SR_3$, or $OR_3$; Y represents H, Cl, the above Z, $SR_4$ or $OR_4$; and E represents Cl or CN, where each of $R_1$, $R_2$, $R_3$, and $R_4$ represents independently H, an alkyl group, a substituted alkyl group, an aryl group, a substituted aryl group, an aralkyl group, a substituted aralkyl group or a hydroxyl group; and $R_1$ and $R_2$ may form a 5- or 6-membered ring together with a nitrogen atom.

Connecting Group (3)

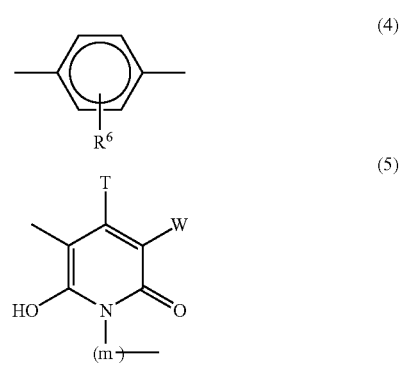

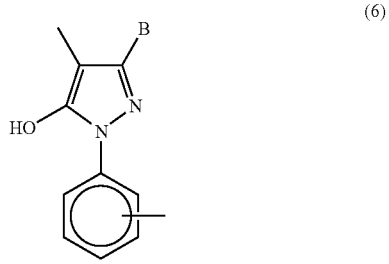

In the above formula (4), $R^5$ is independently selected from the group consisting of a hydrogen atom, an alkyl group, a substituted alkyl group, an alkoxy group, a halogen atom, CN, a ureido group, and $NHCOR^6$, where the $R^6$ is selected from the group consisting of a hydrogen atom, an alkyl group, a substituted alkyl group, an aryl group, a substituted aryl group, an aralkyl group, and a substituted aralkyl group;

in the formula (5), T represents an alkyl group, and W is selected from the group consisting of a hydrogen atom, CN, $CONR_7R_8$, a pyridium group, and a carboxyl group; where each of $R_7$ and $R_8$ is independently selected from the group consisting of a hydrogen atom, an alkyl group, and a substituted alkyl group, m represents an alkylene chain having 2 to 8 carbon atoms; and in the formula (6), B is selected from the group consisting of a hydrogen atom, an alkyl group, and a carboxyl group.

Furthermore, concrete examples of each substituent in the formulae (1) to (6) can be selected according to the fluorescence properties of the predetermined emission.

As shown by the above structural formula (A), the compound (A) has a dimeric structure having plural fluorescence groups and sulfone groups.

Thus, when the fluorescent coloring material contains the fluorescence groups, it increases the fluorescence intensity of the first fluorescent coloring material with excitation at the predetermined excitation wavelength, because of the excellent fluorescence emission corresponding to the predetermined excitation wavelength region of the first fluorescent coloring material. In particular, aminostilbene disulfonic acid derivatives are preferable because of a wide fluorescence emission region.

[Aspect 3]

Aspect 3 is effective alone or in combination with each of Aspects 1 and 2. Aspect 3 is a technology for improving fluorescence intensity by appropriate arrangement of the fluorescent coloring material on the recording medium, utilizing a liquid medium such as a mixture of a first solvent having high solubility to a first coloring material and low solubility to a second coloring material and a second solvent having high solubility to the second coloring material.

Certain dyes cause a chemical phenomenon known as association to maintain an energetically stable state. In this phenomenon of association, for a dye molecule having an almost flat skeleton having two ring structures or less, two molecules face each other and supply and loss of energy occur between these molecules. Therefore, with a fluorescent dye, such a phenomenon may be an inhibiting factor for the fluorescence properties of the dye. Since this stacking state is maintained not only in the ink but also in a printed matter on paper, means for preventing dye association is required. Generally, it has been known to add urea, naphthalene sulfonic acid, or the like as an association-preventing agent for preventing the association. However, if an association-preventing agent itself has florescence property to enhance the fluorescence intensity of the first fluorescent coloring material, and has an association-preventing function, it is possible to attain both effects of enhancing the fluorescence intensity and of efficiently generating fluorescence by virtue of prevention of association.

Then, in preparation of an ink containing a first fluorescent coloring material and a second fluorescent coloring material capable of enhancing the fluorescence intensity of a first fluorescent coloring material when excited at the same excitation wavelength, it is used a mixture solvent containing a first solvent having high solubility to the first coloring material and low solubility to the second coloring material and a second solvent having high solubility to the second coloring material.

Here, the term "having high solubility" or "good solvent" means that the coloring material can be dissolved at a concentration of roughly 3% by mass or more, and the term "having low solubility" or "poor solvent" means that the coloring material can be dissolved at a concentration of less than roughly 3% by mass.

For instance, when water is selected as a first solvent and glycerin is selected as a second solvent, the water has high solubility to AR52 and low solubility to the compound (A) and glycerin has high solubility to the compound (A). Then, ink is prepared by adding AR52 and the compound (A) to a solvent containing water and glycerin. In the ink, the compound (A) is under an environment excess in the poor solvent, so that the compound (A) is dissolved in a weak association state, forming a stable system together with AR52. However, when the ink is placed on a recording medium, the water being a poor solvent quickly diffuses and permeates into the recording medium. On the other hand, glycerin slowly diffuses and permeates into the recording medium due to its high viscosity. At this point, the compound (A) dissolves in, not water being a poor solvent, but in glycerin being a good solvent. Thus, the compound (A) slowly diffuses and permeates into the recording medium together with glycerin. Furthermore, because the glycerin is a good solvent, the compound (A) is absorbed in a monomolecular state by the components of the recording medium. Therefore, good fluorescence emission occurs. Furthermore, the compound (A) is dissolved in a monomolecular state, so that the compound (A) can also prevent the association of AR52. In other word, the molecules of the compound (A) and AR52 are fixed on the recording medium in a state of being mixed and dispersed together to an appropriate degree. Thus, the effect of enhancing the fluorescence intensity of AR52 by the compound (A) becomes significant. In this case, the first fluorescent coloring material and the second fluorescent coloring material each preferably have a plurality of sulfone groups.

Furthermore, for preferable expression of the above phenomenon, the content of the fluorescent coloring material to be used is preferably not more than the amount that the poor solvent can dissolve.

On the other hand, when association prevention is considered in view of the molecular structure of the fluorescent coloring materials, if at least one of the first and second coloring materials has a molecular structure having three or more ring structures, the molecules of the first and second coloring materials is prevented from stacking but present in the vicinity, enabling easy energy transfer and receiving mentioned above. As a result, the fluorescence is intensified.

Thus, the second fluorescent coloring material to be used in the present invention preferably has a plurality of fluorescence groups. More preferably, the second fluorescent coloring material to be used in the present invention further has a basic structure for fluorescence brightening. Furthermore, the fluorescence groups in the second fluorescent coloring material are preferably a dimer.

Examples of a ring structure of a second fluorescent dye are a ring structure having a double bond or a conjugated double bond, an aromatic ring structure, a cyclo ring structure, or a heterocyclic structure. Specific examples thereof include benzene, thiophene, pyridine, pyrrole, coumarin, indene, benzothiazole, benzoxazole, benzoimidazole, benzoselenazole, naphthalene, thionaphthene, quinoline, indole, naphthene, fluorene, diphenylenesulfide, phenanthrene, anthracene, acridine, phenanthridine, carbazole, fluorene, naphthacene, fluoranthrene, pyrene, xanthene, chrysene, triphenylene, perylene, pyrene, picene, quinacridone, and phthalocyanine.

More preferable specific examples thereof include a coloring material having a plurality of a ring structure selected from, as described above, pyrene, coumarin, oxazole, imidazole, thiazole, imidazolone, pyrazole, benzidine, benzidine sulfone, diaminocarbazole, a naphthal ring, diaminostilbene disulfonic acid, and derivatives thereof, and bonded together via a connecting group described above.

When the first fluorescent coloring material and the second fluorescent coloring material are both water-soluble, these two fluorescent coloring materials have preferably the same group for water-solubility for preventing the association more easily. More preferably, the water-solubility group is a sulfone group of which solubility is not affected by the pH of the ink.

In the present invention, the ink may contain a fluorescent or non-fluorescent coloring material as the third coloring material in addition to the above two fluorescent coloring materials.

Next, an aqueous medium that constitutes a fluorescence ink of the present invention together with the dyes described above is described. The aqueous medium to be used in the present invention is preferably an aqueous medium mainly containing water. The content of water in the ink is 10 to 95% by mass, preferably 25 to 93% by mass, more preferably 40 to 90% by mass with respect to the total mass of the ink. The water to be used in the invention is preferably ion-exchanged water.

Furthermore, for the ink of the present invention, water may be solely used as an aqueous medium or may be used in combination with a water-soluble organic solvent to further increase the effects of the present invention.

Specific examples of the water-soluble organic solvent that may be used in the present invention include: alkyl alcohols having 1 to 5 carbon atoms such as methyl alcohol, ethyl alcohol, n-propyl alcohol, isopropyl alcohol, n-butyl alcohol, sec-butyl alcohol, tert-butyl alcohol, isobutyl alcohol, and n-pentanol; amides such as dimethylformamide and dimethylacetamide; ketones or keto alcohols such as acetone and diacetone alcohol; ethers such as tetrahydrofuran and dioxane; oxyethylene and oxypropylene addition polymers such as diethylene glycol, triethylene glycol, tetraethylene glycol, dipropylene glycol, tripropylene glycol, polyethylene glycol, and polypropylene glycol; alkylene glycols having an alkylene group with 2 to 6 carbon atoms such as ethylene glycol, propylene glycol, trimethylene glycol, butylene glycol, pentanediol, and hexylene glycol; triols such as glycerine, trimethylolethane, trimethylolepropane, and 1,2,6-hexanetriol; thiodiglycol; bishydroxyethylsulfone; lower alkyl glycol ethers such as ethyleneglycol monomethyl (or ethyl or butyl) ether, diethyleneglycol monomethyl (or ethyl or butyl) ether, and triethyleneglycol monomethyl (or ethyl or butyl) ether; lower dialkyl glycol ethers such as triethyleneglycol dimethyl (or ethyl) ether and tetraethyleneglycol dimethyl (or ethyl) ether; alkanolamines such as monoethanolamine, diethanolamine, and triethanolamine; sulforane; N-methyl-2-pyrrolidone; 2-pyrrolidone; and 1,3-dimethyl-2-imidazolidinone. The water-soluble organic solvents as above may be used singly or as a mixture thereof.

The content of the water-soluble organic solution in ink is generally equal to or less than 50% by mass, preferably, 5 to 40% by mass, and more preferably 10 to 30% by mass with respect to the total mass of the ink.

Among those solvents, ethylene glycol, diethylene glycol, triethylene glycol, 2-pyrrolidone, glycerine, and 1,2,6-hexanetriol are preferably-used.

Further, the ink of the present invention preferably contains urea, ethylene urea, or trimethylolpropane as a humectant similar to a solvent. Among them, ethylene urea and trimethylolpropane are particularly suitable to the present invention. The content of those is preferably 1% by mass or more and 20% by mass or less with respect to the total mass of the ink.

In the ink of the present invention, if required, additive agents, such as an antifoam, a surface-tension regulator, a pH adjustor, a viscosity modifier, a fluorescence enhancer, an anti-oxidant, an evaporation enhancer, an antirust, a fungicide, and a chelating agent may be blended in addition to the components described above for providing the ink with the properties of predetermined emission.

Furthermore, the viscosity of the ink of the present invention is preferably in the range of 0.7 to 12 cP at 25° C. If the viscosity of the ink is out of the range, the inkjet recording may be performed without normal discharge of ink. Ink with a viscosity in excess of 12 cP is slow to permeate into the recording medium owing to its viscosity resistance, which is not preferable from the viewpoint of fixability.

In addition, the surface tension of ink to be used in the present invention is preferably adjusted in the range of 20 to 60 dyne/cm at 25° C. A surface tension of less than 20 dyne/cm is not preferable. The reason therefor is as follows. After liquid droplets are discharged in the inkjet recording, the force to pull back meniscus may be weakened, or the force to pull back meniscus being projected may be comparatively weak. Therefore, bubbles may be brought over, and orifices may get wet, so that a small surface tension may become the cause of kink. Preparing the ink as described above, the ink proposed in the present invention can be provided as one used for inkjet recording that corresponds to plain paper, in particular ink having excellent storage stability, recording concentration, dry fixability, and print quality.

The fluorescence ink of the present invention constructed as described above is particularly effective when used in inkjet recording. As an inkjet recording method, there are a recording method including acting mechanical energy on ink to discharge-liquid droplets and an inkjet recording method including expanding ink with the supply of thermal energy to the ink to discharge liquid droplets. The fluorescence ink of the present invention is particularly suitable to those inkjet recording methods.

EXAMPLES

Next, the present invention will be described more concretely with reference to the examples and the reference examples. Here, measured values obtained with pure-water diluents of coloring materials were used for an absorption wavelength region, a maximum absorption wavelength region, and a fluorescence wavelength region. Using an absorption spectrometer, absorption wavelengths were measured. A diluent was prepared such that the absorbance thereof was in the range of 0.5 to 0.7. A higher region from a base line as an absorption peak of the coloring material was defined as an absorption wavelength region, and the peak value was defined as a maximum absorption wavelength region. In addition, for fluorescence wavelengths, the measurement conditions were defined such that the fluorescence intensities would not exceed the measurement threshold value. Then, the measurement of fluorescence wavelengths was performed by using the diluent used in the measurement of absorbance and by fixing the excitation wavelengths of the first and second coloring materials at predetermined wavelengths. A region higher than the base line was defined as a fluorescence emission wavelength region.

Inks in the following examples satisfy the configuration of one of print inks according to the first to sixth embodiments of the present invention described above.

Example 1

The following components were added to be adjusted to predetermined concentrations, and then the components were mixed and agitated sufficiently, followed by filtration through a micro-filter (manufactured Fuji Photo Film Co., Ltd.) with a pore size of 0.2 µm under pressure to prepare an ink.

| | |
|---|---|
| C.I. Acid Red 52 (first fluorescent coloring material): | 0.25 part by mass |
| Compound (A) (second fluorescent coloring material): | 1 part by mass |
| Glycerin: | 7.5 parts by mass |
| Diethylene glycol: | 5 parts by mass |
| Urea: | 5 parts by mass |
| Acetylenol E100 (Acetylene glycol EO adduct, manufactured by Kawaken Fine Chemicals Co., Ltd.) | 1 part by mass |
| Water: | 80.25 parts by mass |

The fluorescence emission spectra and excitation spectra of the first and second fluorescent coloring materials were measured using the fluorometer FP-750, manufactured by JASCO Corporation, respectively. Each sample was an ink from which water content was evaporated to remove the influence of water on the measurement.

The absorption wavelength regions of the first and second coloring materials were measured using the spectrophotometer U-3200, manufactured by Hitachi Ltd., after the sample was diluted with pure water 100,000 fold. The absorption wavelength region of the first coloring material ranged from 450 to 620 nm both inclusive, and the maximum absorption wavelength thereof was 565 nm. In addition, the absorption wavelength region of the second coloring material ranged from 300 to 450 nm both inclusive, and the maximum absorption wavelength thereof was 372 nm.

Reference Example 1

The following components were added to predetermined concentrations, and then the components were mixed and agitated sufficiently, followed by filtration through a micro-filter (manufactured by Fuji Photo Film Co., Ltd.) with a pore size of 0.2 µm under pressure to prepare an ink.

| | |
|---|---|
| C.I. Acid Red 52 (first fluorescent coloring material): | 0.25 parts by mass |
| Glycerin: | 7.5 parts by mass |
| Diethylene glycol: | 5 parts by mass |
| Urea: | 5 parts by mass |
| Acetylenol E100 (Acetylene glycol EO adduct, manufactured by Kawaken Fine Chemicals Co., Ltd.): | 1 part by mass |
| Water: | 81.25 parts by mass |

(Evaluation)

(1) Fluorescence Intensity

Using an inkjet recording apparatus (BJS600, manufactured by Canon Inc.) having an on-demand type multi-recording head from which ink is discharged by imparting thermal energy depending on a recording signal to the ink, a solid pattern of 50% duty was printed on inkjet plain paper (SW-101, manufactured by Canon Inc.). Subsequently, under the following conditions, the fluorescence intensity was measured using a fluorometer (FP-750, manufactured by JASCO Corporation). The results were evaluated on the basis of the criteria described below and were listed in Table 1. The conditions at the measurement were as follows: the excitation wavelength was set to 254 nm; the fluorescence intensity at the maximum fluorescence wavelength was measured; and the resulting measured fluorescence intensity was normalized by defining the fluorescence intensity of the ink of Reference Example 1 as 100, followed by evaluation with the following criteria:

AA: The measured fluorescence intensity was 150 or more;

A: The measured fluorescence intensity was 110 or more and less than 150; and

B: The measured fluorescence intensity was less than 110.

(2) Color Development

Using an inkjet recording apparatus (BJS600, manufactured by Canon Inc.) having an on-demand type multi-recording head from which ink is discharged by imparting thermal energy depending on a recording signal to the ink, a solid pattern of 50% duty was printed on inkjet plain paper (SW-101, manufactured by Canon Inc.). Subsequently, the color development property was measured using a Macbeth densitometer of a print recording matter (RD-918, manufactured by Macbeth Co., Ltd.).

AA: 0.7 or more, at which a printed matter is visually legible at once;

A: 0.5 or more and less than 0.7, at which a printed matter is visually legible;

B: 0.3 or more and less than 0.5, at which a printed matter is visually legible with difficulty; and C: less than 0.3, at which a printed matter is not visually legible.

(3) Fastness

Using an inkjet recording apparatus (BJS600, manufactured by Canon Inc.) having an on-demand type multi-recording head from which ink is discharged by imparting thermal energy depending on a recording signal to the ink, a solid pattern of 50% duty was printed on inkjet plain paper (SW-101, manufactured by Canon Inc.). Subsequently, the paper was allowed to stand for 24 hours, and then immersed in running water for 5 minutes. Then, the change of print density was evaluated using Macbeth RD 918 on the basis of the following criteria:

AA: density change of less than 50%, at which a printed matter is visually legible at once;

A: 50% or more and less than 70%, at which a printed matter is visually legible; and B: 70% or more, at which a printed matter is not visually legible.

TABLE 1

|  | (1) Fluorescence intensity | (2) Color development property | (3) Fastness property |
|---|---|---|---|
| Example 1 | AA | A | A |
| Reference Example 1 | B | A | B |

Each ink was prepared according the composition shown in Table 2 in each of Examples 2 to 6 and Reference Examples 2 and 3. In addition, FIGS. 14 to 18 respectively show the relationships of fluorescence, excitation, and absorption by the combination of the first and second coloring materials of Example 4. FIGS. 19 to 22 respectively show the relationships of fluorescence, excitation, and absorption by the combination of the first and second coloring materials of Example 5. FIGS. 23 to 26 respectively show the relationships of fluorescence, excitation, and absorption by the combination of the first and second coloring materials of Reference Example 3. The descriptions of those figures are omitted, but those examples and reference examples will be understood from the technical description of the present invention and the description of the reference examples. In addition, each of the above reference examples uses the combination of the conventional coloring materials while using the same solvent conditions as those of the present invention. Thus, each of the above reference examples is provided as the reference example.

TABLE 2

|  | Example 2 | Example 3 | Example 4 | Example 5 | Example 6 | Reference Example 2 | Reference Example 3 |
|---|---|---|---|---|---|---|---|
| First coloring material | AR52 0.25% by mass | AR52 0.25% by mass | BV10 0.25% by mass | AR52 0.25% by mass | AR52 0.25% by mass | AR52 0.5% by mass | AR52 0.25% by mass |
| Second coloring material | Compound (A) 1% by mass | Compound (A) 2% by mass | Compound(A) 1% by mass | SG7 0.3% by mass | Compound (A) 1% by mass | AY73 0.5% by mass | AY18 41% by mass |
| Third coloring material | AR92 0.6% by mass | AR92 0.6% by mass | — | — | — | — | — |
| First solvent | Glycerin 7.5% by mass | Glycerin 7.5% by mass | Triethylene glycol 7.5% by mass | Xylitol 7.5% by mass | — | Glycerin 7.5% by mass | Glycerin 7.5% by mass |
| Diethylene glycol | 5% by mass | 5% by mass | 5% by mass | 5% by mass | 5% by mass | 5% by mass | 5% by mass |
| Urea | 5% by mass | 5% by mass | 5% by mass | 5% by mass | 5% by mass | 5% by mass | 5% by mass |
| Acetylenol E100 | 1% by mass | 1% by mass | 1% by mass | 1% by mass | 1% by mass | 1% by mass | 1% by mass |
| Second solvent (water) | 79.65% by mass | 78.65% by mass | 80.25% by mass | 80.95% by mass | 87.75% by mass | 80.5% by mass | 80.25% by mass |

Each of inks prepared as above was irradiated with light at an excitation wavelength of 254 nm. Then, the spectrum of the resulting fluorescence emission was obtained. For the inks of Examples 2 to 4, effects such as two strong peaks in fluorescence intensities were obtained as seen from FIGS. 7 and 8 and comparison therebetween. On the other hand, such a relationship found in FIGS. 7 and 8 was not found in the inks of Reference Examples 1 to 3.

Furthermore, the fluorescence intensities and so on were evaluated just as in the case of each of Example 1 and Reference Example 1. As shown in Table 3, there were substantial differences between the examples and the reference examples.

TABLE 3

|  | (1) Fluorescence intensity | (2) Color development | (3) Fastness |
|---|---|---|---|
| Example 2 | AA | AA | AA |
| Example 3 | AA | AA | AA |
| Example 4 | AA | A | A |
| Example 5 | AA | A | A |
| Example 6 | A | A | A |
| Reference Example 2 | B | AA | B |
| Reference Example 3 | B | A | B |

As described above, according to the present invention, there are provided: a fluorescence ink having a high fluorescence intensity, high color development property, and high fastness property, which cannot be attained in the prior art; and an inkjet recording method using such a fluorescence ink.

What is claimed is:

1. A print ink comprising:
   a first fluorescent coloring material that emits a fluorescence at a predetermined emission wavelength to be used for measurement or determination on excitation at a predetermined excitation wavelength; and
   a second fluorescent coloring material that emits a fluorescence with excitation at the predetermined excitation wavelength,
   wherein an excitation spectrum of the first coloring material in the ink to obtain the fluorescence at the predetermined emission wavelength has a peak wavelength range next to the predetermined fluorescence wavelength, and an emission fluorescence spectrum of the second coloring material has an emission wavelength region that includes at least the peak wavelength range,
   wherein the ink contains more of the second fluorescent coloring material than the first fluorescent coloring material, and
   wherein the first fluorescent coloring material is C.I. Acid Red 52 and the second fluorescent coloring material is the compound (A) having the following structure:

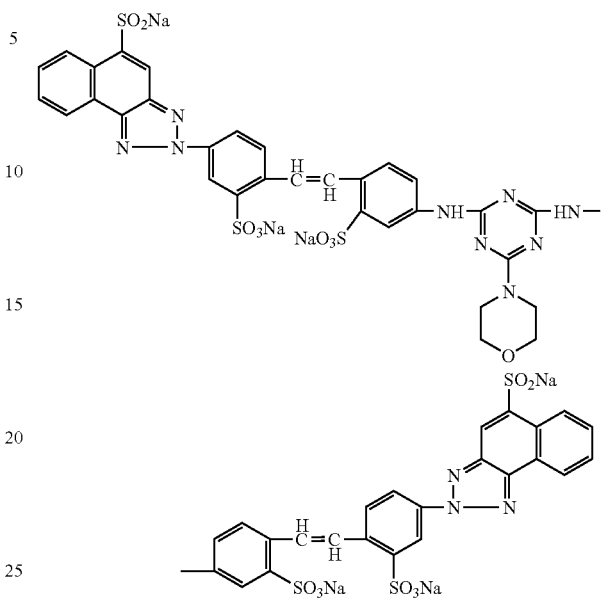

(A)

2. An inkjet recording method, comprising the steps of:
   ejecting an ink through a discharge port; and
   attaching the ink on a recording medium to thereby perform recording, the ink being the print ink according to claim 1.

* * * * *

UNITED STATES PATENT AND TRADEMARK OFFICE
CERTIFICATE OF CORRECTION

PATENT NO. : 7,144,449 B2
APPLICATION NO. : 10/866116
DATED : December 5, 2006
INVENTOR(S) : Masako Udagawa et al.

It is certified that error appears in the above-identified patent and that said Letters Patent is hereby corrected as shown below:

COLUMN 1:
Line 15, "printers-including" should read --printers including--.

COLUMN 2:
Line 38, "exposed" should read --exposed to--.

COLUMN 6:
Line 31, "to ,fourth" should read --to fourth--.

COLUMN 7:
Line 18, "preferabe" should read --preferable--.
Line 24, " 'sixth" should read --sixth--.
Line 37, "the," should read --the--.
Line 45, "emit" should read --emits--.
Line 66, "five" should read --fifth--.

COLUMN 11:
Line 55, "fluorescent" should read --fluorescent coloring materials--.

COLUMN 13:
Line 58, "ranging" should read --ranging from--.

COLUMN 14:
Line 18, "a-coloring" should read --a coloring--.

COLUMN 15:
Line 30, "as a" should read --as α--.

COLUMN 16:
Line 17, "of present" should read --of the present--.
Line 46, "AR 52" should read --AR52--.

COLUMN 20:
Line 39, "$R^6$" should read --$R^5$--.

COLUMN 22:
Line 28, "word," should read --words,--.

UNITED STATES PATENT AND TRADEMARK OFFICE
CERTIFICATE OF CORRECTION

PATENT NO. : 7,144,449 B2
APPLICATION NO. : 10/866116
DATED : December 5, 2006
INVENTOR(S) : Masako Udagawa et al.

It is certified that error appears in the above-identified patent and that said Letters Patent is hereby corrected as shown below:

COLUMN 24:
Line 5, "preferably-used." should read --preferably used.--.
Line 51, "discharge-liquid" should read --discharge liquid--.

Signed and Sealed this

Twenty-third Day of October, 2007

JON W. DUDAS
*Director of the United States Patent and Trademark Office*